(12) United States Patent
Clarke et al.

(10) Patent No.: US 7,068,430 B1
(45) Date of Patent: Jun. 27, 2006

(54) METHOD OF MAKING HIGHLY DISCRIMINATING OPTICAL EDGE FILTERS AND RESULTING PRODUCTS

(75) Inventors: Glenn Clarke, Rochester, NY (US);
Turan Erdogan, Spencerport, NY (US);
Joseph T. Foss, Rochester, NY (US);
Ligang Wang, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 0 days.

(21) Appl. No.: 10/840,134

(22) Filed: May 6, 2004

Related U.S. Application Data

(60) Provisional application No. 60/468,245, filed on May 6, 2003.

(51) Int. Cl.
*G02B 5/28* (2006.01)

(52) U.S. Cl. .................. 359/589; 359/587; 359/588; 359/580

(58) Field of Classification Search ............. 359/589, 359/587; 204/192.13
See application file for complete search history.

(56) References Cited

U.S. PATENT DOCUMENTS

| | | | |
|---|---|---|---|
| 4,142,958 A | 3/1979 | Wei et al. | 204/192 |
| 4,793,908 A | 12/1988 | Scott et al. | 204/192.26 |
| 5,112,127 A | 5/1992 | Carrabba et al. | 356/301 |
| 5,216,542 A * | 6/1993 | Szczyrbowski et al. | 359/588 |
| 5,512,131 A | 4/1996 | Kumar et al. | 156/655.1 |
| 5,656,138 A | 8/1997 | Scobey et al. | 204/192.12 |
| 5,712,715 A | 1/1998 | Erdogan et al. | 359/8 |
| 5,900,160 A | 5/1999 | Whitesides et al. | 216/41 |
| 6,518,168 B1 | 2/2003 | Clem et al. | 438/623 |
| 6,628,803 B1 | 9/2003 | Krivokapic | 427/304 |
| 6,641,704 B1 * | 11/2003 | Someno | 204/192.12 |
| 6,649,208 B1 | 11/2003 | Rodgers | 427/10 |
| 6,704,130 B1 | 3/2004 | Ford et al. | 359/245 |
| 6,809,859 B1 | 10/2004 | Erdogan et al. | 359/359 |
| 2005/0110999 A1 | 5/2005 | Erdogan et al. | 356/417 |
| 2005/0167264 A1 * | 8/2005 | Sternbergh et al. | 204/192.13 |

OTHER PUBLICATIONS

Becker, J., "Ion-Beam Sputtering," Handbook of Optical Properties, vol. 1, Thin Films for Optical Coatings, Ed. By R.E. Hummel and K.H.Guenther, Chapter 7, pp. 189-211, (CRC Press, Boca Raton, 1995).

Macleod, H. Angus, "Thin-Film Optical Filters," 3rd Ed., Institute of Physics (2001).

(Continued)

*Primary Examiner*—Fayez G. Assaf
(74) *Attorney, Agent, or Firm*—Lowenstein Sandler PC

(57) ABSTRACT

Highly discriminating optical edge filters and methods of making the same are disclosed. The optical edge filters have an edge steepness greater than about 0.8% as measured by dividing (a) the edge width from the 50% transmission wavelength to the optical density 6 ("OD6") wavelength by (b) the 50% transmission wavelength. The optical filters also have an average transmission above about 95%. The methods for making such filters accurately determine when deposition of each layer of the filter should terminate. The methods include calculating theoretical transmission data for a layer of the filter and calculating an expected deposition duration for the layer. The methods also include measuring transmission through the layer during deposition for a period less than the expected deposition duration. When the measuring period elapses, a new deposition duration is calculated based upon the theoretical transmission data and the measured transmission data, thereby providing an accurate deposition duration for the layer.

41 Claims, 7 Drawing Sheets

OTHER PUBLICATIONS

Macleod, H.A., "Turning value monitoring of narrow-band all-dielectric thin-film optical filters," Optica Acta, vol. 19, pp. 1-28 (1972).

Press, W.H., et al., The Levenberg-Marquardt method implemented under the name "mrqmin()", *Numerical Recipes in C: The Art of Scientific Computing*, 2nd ed., Chapter 15, pp. 683-688 (1995).

Martin, P.J. et al., "Ion-beam-assisted deposition of thin films," Applied Optics, vol. 22, No. 1, pp.178-184 (1983).

"Interference Filters, " Melles Griot, pp. 13.25-13.29.

J.M.E. Harper, "Ion Beam Deposition," in *Thin Film Processes*, Ed. by J.L. Vossen and W. Kern, pp. 175-206 (Academic Press, New York, 1978).

U.J. Gibson, "Ion-Beam Processing of Optical Thin Films," in *Physics of Thin Films*, vol. 13, Ed. by G. Hass and M.H. Fancombe, pp. 109-150 (Academic Press, New York, 1978).

J.M.E. Harper et al., "Modification of Thin Film Properties by Ion Bombardment During Deposition," In *Ion Bombardment Modification of Surfaces*, Ed. by O. Auciello and R. Kelly, from *Beam Modification of Materials*, vol. 1, pp. 127-162 (Elsevier, Amsterdam, 1984).

W.H. Teukolsky et al., *Numerical Recipes*, "Numerical Recipes in C: The Art of Scientific Computing," 2nd ed., Cambridge University Press, Cambridge, Chapter 15.7, pp. 699-706 (1995).

* cited by examiner

METHOD OF MAKING HIGHLY DISCRIMINATING OPTICAL EDGE FILTERS AND RESULTING PRODUCTS

CROSS REFERENCE TO RELATED APPLICATIONS

This application claims the benefit of U.S. Provisional Patent Application Ser. No. 60/468,245 filed by Ligang Wang on May 6, 2003 and entitled "Highly Discriminating Optical Edge Filters", which application is incorporated herein by reference.

FIELD OF INVENTION

This invention relates to methods of making optical edge filters and to the resulting improved filters. The filters provide a factor of two improvement in edge steepness and a factor of two reduction in transmission loss.

BACKGROUND OF THE INVENTION

A. Optical Edge Filters and their Use

Optical edge filters are key components in important systems for optical measurement and analysis including Raman spectroscopy and fluorescence microscopy. Optical edge filters are used in these systems to block unwanted light that would otherwise generate spurious optical signals and swamp the signals to be detected.

Optical edge filters block unwanted light having wavelengths above or, alternatively, below a chosen "transition" wavelength $\lambda_T$ while transmitting light on the unblocked side of $\lambda_T$. Edge filters which transmit optical wavelengths longer than $\lambda_T$ are called long-wave-pass filters (LWP filters), and edge filters which transmit wavelengths shorter than $\lambda_T$ are short-wave-pass or SWP filters.

Referring to the drawings, FIGS. 1A and 1B schematically illustrate the spectral transmission of idealized long-wave-pass and short-wave-pass filters respectively. As can be seen from FIG. 1A, a LWP filter blocks light with wavelengths below $\lambda_T$ and transmits light with wavelengths above $\lambda_T$. As shown in FIG. 1B, a SWP filter transmits light with wavelengths below $\lambda_T$ and blocks light with wavelengths above $\lambda_T$. $\lambda_T$ is the wavelength at which the filter "transitions" from blocking to transmission, or vice versa.

While an ideal edge filter has a precise transition wavelength $\lambda_T$ represented by a vertical line at $\lambda_T$, real edge filters change from blocking to transmission over a small range of wavelengths and are more accurately represented by a non-vertical but steeply sloped line near $\lambda_T$. Similarly, while an ideal edge filter transmits all light in the transmission region (transmission T=1), real filters invariably block a small portion of the light to be transmitted (T<1). The steepness of the line and the proportion of the light transmitted are important parameters in many applications.

Edge filters are particularly useful in optical measurement and analysis systems that use light of one wavelength to excite a sample and measure or view an optical response of the excited sample at other wavelengths. The excitation light is delivered to the sample by an excitation light path, and the optical response of the sample is delivered to the eye or measuring instrument by a collection path. Edge filters can be used to block spurious light from the excitation path and to block excitation light from entry into the collection path. The steeper the filter edge, the more effectively spurious signals are blocked. The lower the transmission loss, the more light from the sample reaches the measuring instrument.

Raman spectroscopy is one such optical analysis system. It is based on the fact that when molecular material is irradiated with high intensity light of a given wavelength $\lambda$, a small portion of the incident light scattered by the material will be shifted in wavelength above and below $\lambda$. This Raman shifting is attributed to the interaction of the light with resonant molecular structures within the material, and the spectral distribution of the Raman-shifted light provides a spectral "fingerprint" characteristic of the composition of the material. As a practical example, one can use a Raman probe to identify the contents of a bottle without opening the bottle.

FIG. 2 is a simplified schematic diagram of a Raman probe 20 designed to excite and collect the long wavelength portion of Raman-shifted light from a sample 21. In essence, the probe 20 comprises an optical fiber excitation path 22, and a fiber collection path 23. Edge filters 22A and 23A are disposed in the respective paths.

In operation, excitation light from a laser 24 passes through the fiber path 22 and edge filter 22A to illuminate a portion of the sample 21 with high intensity light of a wavelength $\lambda$. Light scattered from the sample 21 passes through edge filter 23A and then through fiber collection path 23 to a spectral analyzer 25 where the "fingerprint" of the sample is determined.

Since the fiber 22 through which the excitation signal passes is composed of molecular material, a small portion of the excitation light will be shifted in wavelength by the Raman effect in the fiber. This shifted light must be eliminated to prevent false readings. The removal can be accomplished by disposing a SWP edge filter 22A between the fiber 22 and sample 21. SWP edge filter 22A, having a transition wavelength just above the laser wavelength, blocks both long wavelength Raman scattering from the fiber and long wavelength noise from the laser.

However, in some cases, a filter 22A is not needed. For instance, if the excitation signal is direct laser radiation that does not pass through molecular material at any appreciable length, the filter 22A is not necessary. An example would be direct laser radiation illuminating a sample 21 through a vacuum.

The light scattered from the sample 21 is a mixture of unshifted scattered excitation light (Rayleigh scattering) and Raman-shifted light. The scattered excitation light would not only swamp the analyzer, it would also excite spurious Raman scattering in the collection fiber. Thus the unshifted excitation light should be removed from the collection path. This can be accomplished by disposing a long pass edge filter 23A between the sample 21 and the collection fiber 23, the long pass filter having a transition wavelength $\lambda_T$ just below the excitation wavelength $\lambda$. This arrangement ensures that the light reaching the analyzer is predominantly the long wavelength Raman-shifted light from the sample. Analogous arrangements using edge filters can be used to analyze short wavelength Raman-shifted light.

Edge filters are equally useful in fluorescence microscopy. Here excitation light is used to excite longer wavelength emission from fluorescent markers. The markers can be fluorescent atoms chemically bonded to a biological molecule to track the molecule in a body or cell. Edge filters are used, as in Raman spectroscopy, to reject spurious low wavelength light from the excitation path and to reject excitation light from the collection path.

It should now be clear that the steeper the filter slope at the transition wavelength $\lambda_T$ the greater the amount of spurious light that can be filtered out. In addition, the steeper the slope, the greater the amount of shifted light from the sample that will reach the analyzer. Similarly, higher levels of transmission of the shifted light through the filters provide more light for analysis. Higher edge filter blocking provides better rejection of the laser excitation light from the spectrum analyzer, thus decreasing the noise and improving both specificity and sensitivity of the measurement. Higher edge-filter transmission enables the maximum signal to reach the analyzer, further improving the signal-to-noise ratio and hence the measurement or image fidelity. A steeper filter edge also permits shifts to be resolved much closer to the excitation wavelength, thus increasing the amount of information from the measurement.

B. Edge Filter Structure and Conventional Fabrication

FIG. 3 is a simplified schematic illustration of an optical edge filter 30 comprising a transparent substrate 31 having a flat major surface 32 supporting many thin coatings 33A, 33B. The thickness of the coatings is exaggerated and the number is reduced for purposes of illustration. Coatings 33A and 33B are typically alternating and of different respective materials chosen to present markedly different indices of refraction (index contrast). The coating indices and thicknesses are chosen and dimensioned to filter impinging light by interference effects in a desired manner. Specifically, if a light beam 34 impinges on the filter, a first wavelength portion 34T of the beam is transmitted and a second wavelength portion 34R is reflected and thus rejected by the filter. What is transmitted and what is reflected depends on the precise thickness and indices of the thin coatings. There are two basic types of thin-film edge filters: those based on "soft coatings" and those based on "hard coatings," both of which are typically manufactured by an evaporation technique (either thermal evaporation or electron-beam evaporation). Hard coating filters, however, may also be manufactured by non-evaporative techniques such as ion beam sputtering.

Soft coatings imply literally what the name suggests— they are physically soft and can be readily scratched or damaged. They are fairly porous, which also means they tend to be hygroscopic (absorb water vapor) leading to dynamic changes in the film index and hence the resulting filter spectrum in correlation to local humidity. There are two main reasons soft coatings are used. First, an advantageous larger index contrast can be realized with soft coatings. (The index contrast is the relative difference between the index of refraction of the low-index material and that of the high-index material.) For example, many high-performance soft-coated filters are made using sodium aluminum fluoride ("cryolite"), with a chemical composition of $Na_3AlF_6$ and an index of about 1.35 for visible wavelengths, and zinc sulfide, with a chemical composition of ZnS and an index of about 2.35. The second reason for using these materials is that the evaporation process can be controlled well for these materials, largely because they have relatively low melting temperatures. Hence it is possible to maintain fairly accurate control over the layer thicknesses even for filter structures with many 10's of layers and perhaps even up to 100 layers. As described above, edge filter performance is measured by edge steepness, depth of blocking, and high transmission with low ripple. A larger index contrast and a larger number of layers both yield more steepness and more blocking. High transmission with low ripple is improved with more layers and higher layer thickness accuracy. For these reasons the highest performance conventional thin-film edge filters have been made with soft-coating technology.

Hard coatings are made with tougher materials (generally oxides), and result from "energetic" deposition processes, in which energy is explicitly supplied to the film itself during the deposition process. This is accomplished with a beam of ions impinging directly on the coating surface. The ion bombardment acts to "hammer" the atoms into place in a more dense, less porous film structure. Such processes are usually called ion-assisted deposition (IAD) processes. High-performance edge filters have been made with ion-assisted electron-beam evaporation. Typically the index contrast available with hard-coating (oxide) thin-film materials is not as high as that of the soft-coating materials, and consequently more layers must be deposited to achieve a comparable level of performance. This problem, coupled with the more difficult to control deposition rates and overall processes of high-melting-temperature oxides, leads to much more stringent requirements on the layer-thickness control techniques to achieve a reasonable level of layer thickness accuracy for good edge steepness and high, low-ripple transmission.

For the best edge filters, some kind of "optical monitoring" (direct measurement of filter transmission or reflection during deposition) is necessary to determine when to terminate the deposition of each layer. Optical monitoring can be performed on the actual filters of interest or on "witness pieces" often positioned in the center of the deposition chamber. There are three basic types of optical monitoring algorithms. The first is often called "drop-chip" monitoring, and is based on measuring the transmission (or reflection) vs. time through a new witness piece for each new layer. Since the theoretical transmission vs. time can be calculated accurately for each layer deposited on a blank piece of glass, then a good comparison between the measured and theory curves can be made independent of the history of the deposition (thickness errors in previous layers). This technique is accurate and useful for layers of arbitrary thickness, but it is cumbersome, especially for filters comprised of at least many 10's of layers.

The second type of monitoring is called "turning-point" monitoring, and is used for depositing layers that are precisely a quarter of a wavelength in thickness (or multiples thereof). The technique is based on the fact that the transmission vs. time reaches a turning point (or extremum) at each multiple of a quarter wave of thickness, so an algorithm is developed to cut layers precisely at the turning points. The elegant feature of this method is that there is inherent compensation for layer thickness errors from previous layers, so long as one adheres to the rule of cutting exactly at turning points. It thus works extremely well even for very thick coatings with even hundreds layers (it is the basis for manufacturing very high-performance filters for DWDM telecom applications, which can have as many as 200–400 quarter-wave layers).

The third type of monitoring is called "level monitoring," and is applicable for non-quarter-wave thick layers. Monitoring can be done through the actual filters or through witness piece(s). The concept is to cut layers at predetermined transmission levels, based on a calculated prediction of transmission vs. time for the entire structure. However, because small layer errors lead to large variations in the absolute transmission values, one must instead rely on cutting at the correct transmission level relative to the local maximum and minimum values. Hence the method works well only for non-quarter-wave thick layers that are more than a half-wave thick, so that there is both a maximum and a minimum transmission value in the transmission vs. time curve for that layer. Even in this case, this method does not contain inherent compensation for errors in the thickness of previously deposited layers, and thus is not as forgiving as the turning-point method. However, to obtain an edge filter with high transmission and low ripple requires primarily non-quarter-wave thick layers, and hence turning-point monitoring is not applicable for edge filters.

Accordingly there is a need for an improved method of making an optical edge filter and for improved edge filters having increased edge steepness and reduced transmission.

SUMMARY OF THE INVENTION

These problems are addressed and a technical solution achieved in the art by highly discriminating optical edge filters and methods of making the same according to the present invention. In particular, the optical edge filters have an edge steepness less than about 0.8% as measured by dividing (a) the edge width from the 50% transmission wavelength to the optical density 6 ("OD6") wavelength by (b) the 50% transmission wavelength. The optical filters also have an average transmission above about 95%. The methods for making such filters accurately determine when deposition of each layer of the filter should terminate. The methods include calculating theoretical transmission data for a layer of the filter and calculating an expected deposition duration for the layer. The methods also include measuring transmission through the layer during deposition for a period less than the expected deposition duration. When the transmission data and the measured transmission data, thereby providing an accurate deposition duration for the layer.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for data graphs, are not to scale.

DETAILED DESCRIPTION OF THE INVENTION

The invention has four aspects: A) apparatus programmed to make improved optical edge filters; B) the method of making the improved filters; C) the improved filters made by the method and D) applications of the improved filters. These aspects will be described in the order presented.

A. Apparatus for Making Optical Edge Filters in Accordance with the Invention

Optical edge filters in accordance with the invention are made using a computer-controlled deposition system. Advantageously the deposition is an ion beam sputtering deposition system using a beam assist source for depositing hard coatings and having an integral optical monitoring system to monitor deposition. A data processor, responsive to signals from the monitoring system, processes these signals and directs the growth of improved optical edge filters in accordance with algorithms described below.

Figure 4:
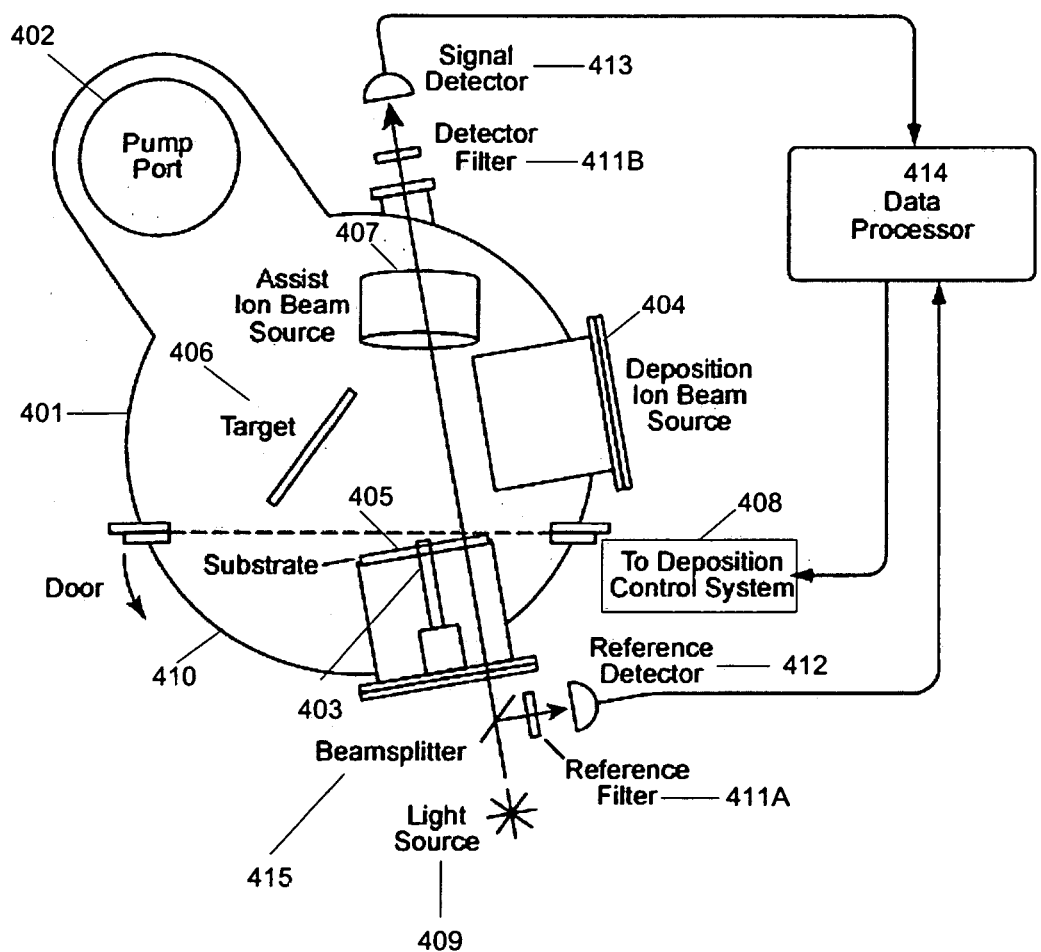
FIG. 4 is a schematic diagram of apparatus useful in making an optical edge filter in accordance with the invention.

FIG. 4 is a schematic view of an advantageous computer-controlled deposition apparatus 400 for practicing ion beam sputtering disposition, ion beam assisted deposition and optical monitoring under data processor control. The apparatus 400 comprises a vacuum chamber 401 having an interior accessible by a sealable port 402 such as an o-ring sealed door. The chamber 401 includes a pump port 402 for coupling to one or more evacuation pumps (not shown) such as mechanical and low pressure cryogenic pumps.

Within the chamber 401 is a substrate mount 403 which is advantageously a rotatable spindle mount. Also within the chamber are a plurality of material targets, a deposition ion beam source 404, and a mounted substrate 405. One of the targets 406 is positioned in relation to the ion beam source and the substrate so that an ion beam from the source will sputter material from the target onto the substrate in a substantially uniform layer. Typically there are separate targets for each material to be deposited on the substrate, and the targets are movable to and from the sputtering position. There are usually two material targets: one a high optical index material and the other a low index material. The targets are movable so that deposition can be switched automatically from one material to the other.

An assist ion beam source 407 is disposed in the chamber 401 in position to bombard the substrate 405 with an ion beam. During the deposition of any one material, the substrate is simultaneously bombarded by sputtered material and by ions from the assist ion beam source 407. The assist ion bombardment serves to energize the adhesion of particles onto the surface of the substrate and thereby produce a substantially more dense ("hard") film than would otherwise be formed by sputter deposition. See J. M. E. Harper et al., "Modification of Thin Film Properties by Ion Bombardment During Deposition," in *Ion Bombardment Modification of Surfaces*, Ed. By O. Auciello and R. Kelly, from *Beam Modifications of Materials*, Vol. 1 (Elsevier, Amsterdam, 1984).

Both the sputter deposition and the assist bombardment can be activated by a deposition control system 408. The control system 408 can start or stop deposition precisely by turning on and off the deposition ion beam source 404 or by removing or engaging a mechanical shutter (not shown) that covers the substrate. Further details concerning ion beam sputtering deposition systems can be found in U.S. Pat. No. 4,142,958 issued to David Wei et al. on Mar. 6, 1979 and U.S. Pat. No. 4,793,908 issued to Gene Scott et al. on Dec. 27, 1988, both of which are incorporated herein by reference. See also Juergen Becker, "Ion Beam Sputtering,"

Handbook of Optical Properties, Vol. 1, Thin Films for Optical Coatings, Ed. by R. E. Hummel and K. H. Guenther (CRC Press, Boca Raton, 1995).

The optical monitoring system advantageously comprises a light source 409, filters 411A and 411B, detectors 412 and 413 and a data processor 414. The light source 409 can be any sufficiently bright, broadband light source, such as a quartz halogen bulb or a Xenon discharge lamp. The detectors can include a reference detector 412 and a signal detector 413. The detectors can be semiconductor (Si) photodiodes, photomultiplier tubes or any other sensitive, low-noise detectors capable of detecting light at the monitoring wavelength.

In the advantageous arrangement shown here, a beamsplitter 415 picks off a portion 416 of the monitoring light beam 417 from source 409 and detects it with reference detector 412. The signal detector 413 detects the portion 418 of the beam 417 that passes through the coated substrate (or a "witness" substrate) being monitored. Advantageously, the filters 411A and 411B are positioned to ensure that a sufficiently narrow band of wavelengths is monitored.

The filters 411A, 411B can be narrow band interference filters, adjustable diffraction-grating monochromators or combinations thereof. Advantageously an interference filter is used for reference filter 411A and a monochromator is used for detector filter 411B. Further details concerning optical monitoring of thin films as they are being deposited can be found in U.S. Pat. No. 6,649,208 issued to Wayne Rodgers on Nov. 18, 2003, which is incorporated herein by reference. See also H. Angus Macleod, *Thin Film Optical Filters* (3$^{rd}$ Ed., Institute of Physics, Bristol, 2001) and H. A. Macleod, "Turning Value Monitoring of Narrow-Band All-Dielectric Thin-Film Optical Filters," *Optica Acta*, vol. 19, pp. 1–28(1972).

The data processor 414 collects data from the signal and reference detectors 413, 412, implements the mathematics associated with optical monitoring algorithms and instructs the deposition control system 408 when to stop depositing any given thin film layer based on the result of the mathematical calculations prescribed in the algorithm.

B. Methods of Making the Improved Edge Filters

The manner in which the data processor 414 controls the apparatus 400 via the deposition control system 408 to generate the optical edge filters according to the present invention will now be described. In particular, the data processor 414 is programmed to instruct the apparatus 400 when to stop depositing each layer of the optical edge filter being manufactured. The data processor 414 follows two separate processes in determining when deposition of a layer should terminate depending upon whether a long-wave-pass or a short-wave-pass filter is being manufactured. These two processes will be described in turn.

Figure 5:
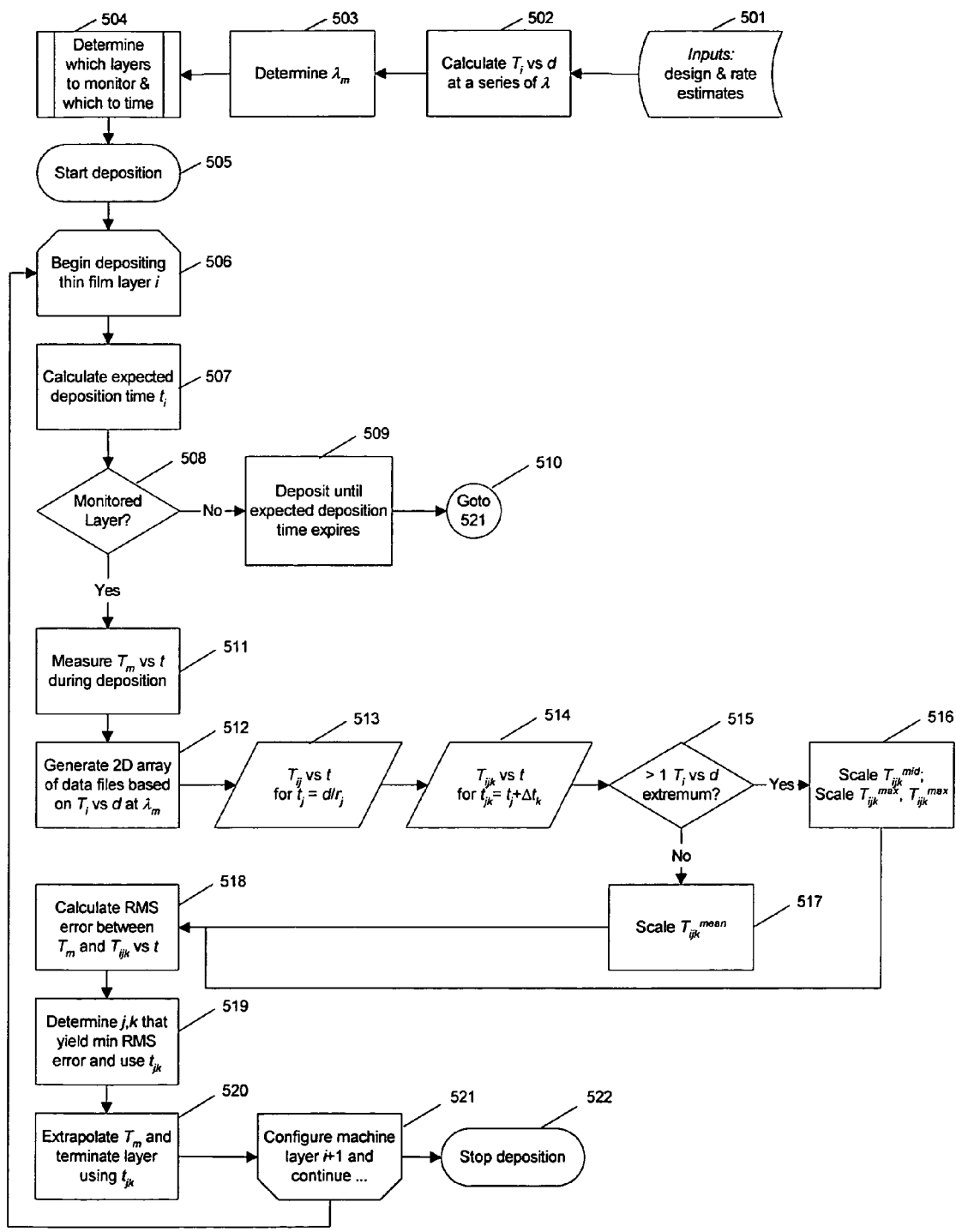
FIG. 5 is a process flow illustrating the process of manufacturing a long-wave-pass filter in accordance with the invention.

FIG. 5 illustrates the process flow executed by the data processor 414 when manufacturing a long-wave-pass ("LWP") filter according to the present invention. However, prior to initiating the process of FIG. 5, a design for the LWP filter is prepared. In the exemplary embodiment, the LWP filter has N layers and comprises two materials: a low-refractive-index material and a high-refractive-index material. The exemplary initial design for a steep LWP edge filter includes a quarter-wave ("QW") stack of (0.5H L 0.5H)^N, where L and H represent layers of high and low index materials with a quarter-wave of optical thickness at the reference wavelength. The reference wavelength is chosen so that the longer-wavelength edge of the QW stopband is close to the desired transition wavelength of the LWP filter design.

Once the initial design is setup, a desired target spectrum is constructed, which typically includes the wavelength ranges of both the blocking and passband regions, as well as the required blocking level and minimum transmission and allowable ripple within the passband. The edge steepness is thus indirectly defined as the wavelength separation between the blocking region and the passband.

The layer thicknesses of the initial design are then optimized against the target spectrum by an optimization routine known in the art. Exemplary optimization routines include the variable-metric or simplex methods implemented in standard commercial thin-film design software packages, such as TFCalc by Software Spectra, Inc., and The Essential Macleod by Thin Film Center Inc. Usually, with the proper choice of the initial design, the optimization quickly converges and the optimized structure is not very different from the initial structure. Special treatments are required for the first layer (toward substrate) and the last layer. The optical thickness of the first layer is manually increased by at least two QWs. As for the last layer, it sometimes becomes too thin and, consequently, should be eliminated. The structure should be re-optimized whenever there is any modification to the layer thickness.

With the LWP filter design at hand, the data processor 414 receives design data and deposition rate data as input at 501. The design data describes the designed thin-film structure of the LWP filter with a physical thickness $d_i$ and an index $n_i$ for each $i^{th}$ layer. $n_i$ is either $n_L$ or $n_H$, where $n_L$ is the refractive index of the low-index material and $n_H$ is the refractive index of the high-index material. $n_L$ and $n_H$ are each known as a function of wavelength $\lambda$. The deposition rate data describes the known starting deposition rate of the deposition apparatus 400 shown in FIG. 4 for each of the two materials. In the exemplary embodiment, the deposition rate data is within about +/−5% of the actual deposition rate and is in units of Å/sec. The starting rate estimates for each of the two materials are referred to as $r_L$ and $r_H$, and hence each layer will have a starting rate estimate $r_i$ depending on whether it is made of low-index or high-index material.

At 502, the transmission $T_i$ as a function of physical thickness d for each $i^{th}$ layer is calculated at a series of wavelengths in the transmissive band of the finished filter. Consequently, the calculations at 502 result in a series of curves $T_i$ vs. d at each of the series of wavelengths in the transmissive band of the finished filter. Such calculations are performed using standard mathematical methods for calculating the optical properties of thin-film filters. See, for example, H. A. Macleod, *Thin-film Optical Filters*, 3$^{rd}$ edition (Institute of Physics, Bristol, 2001).

Advantageously, instead of calculating each $T_i$ vs. d curve at one corresponding wavelength in the series of wavelengths, each $T_i$ vs. d curve is calculated by averaging a plurality of $T_i$ vs. d curves calculated at a range of wavelengths surrounding the corresponding wavelength. For instance, assume that the series of wavelengths includes 501 nm and 502 nm. Instead of calculating a $T_i$ vs. d curve at just 501 nm, this $T_i$ vs. d curve is advantageously calculated by averaging $T_i$ vs. d curves calculated at, for instance, 500 nm, 501 nm, and 502 nm. Further, the $T_i$ vs. d curve at 502 nm is advantageously calculated by averaging $T_i$ vs. d curves calculated at, for instance, 501 nm, 502 nm, and 503 nm. One skilled in the art will appreciate that invention is not limited to this averaging procedure and the range of wavelengths used.

At 503, an optical monitoring wavelength $\lambda_m$ is selected from the series of wavelengths in the transmissive band of the finished filter, thereby identifying a single curve $T_i$ vs. d at $\lambda_m$ from the series of curves computed at 502. The monitoring wavelength $\lambda_m$ is determined based on the contrast of the monitoring signal within each layer. The contrast is defined as the relative range of the monitoring signal within the layer of interest. The higher the contrast, the more robust the process flow of FIG. 5 will be with respect to random signal noise.

Advantageously, the relative separation between the monitoring and cutoff wavelengths should be at least about 2%. Once above 2%, the monitoring wavelength $\lambda_m$ should be chosen to maximize the contrast of each layer. In addition, the optical thickness of the first layer toward the substrate has a significant impact on the signal contrast for the rest of the Therefore, the optical thickness of the first layer should be close to three quarter-wavelengths at the monitoring wavelength $\lambda_m$.

Having determined the monitoring wavelength $\lambda_m$ at 503, processing advances to 504 where it is determined how the deposition duration for each layer will be calculated. For layers that are predicted to have little error between the designed thickness d and a simulated actual thickness, deposition duration is controlled by optically monitoring transmission levels $T_m$ through the layer during deposition. For the other layers, their deposition durations are controlled using an expected deposition time $t_i$ based upon designed ("theoretical") thickness $d_i$ and deposition rate $r_i$. Accordingly, at 504, the data processor 414 determines which layers are to be optically monitored and which layers are to be timed using an expected deposition time.

To determine which layers will be optically monitored, the data processor 414 enters a simulation mode to simulate deposition of each of the layers of the optical filter. Only the layers that are determined by the simulation to have the least amount of error are selected for optical monitoring. The simulation mode is nearly identical to the process described below with reference to 505 to 522, except that layers are not actually deposited at 505 and 506, the processing described at 508 is skipped, and instead of actually measuring transmission data $T_m$ vs. t at 511, it is generated. $T_m$ vs. t is generated by adding random noise to the theoretical data $T_i$ vs. d at $\lambda_m$ from 502 and 503. In the exemplary embodiment, 0.2% peak-to-peak random noise is used, and the maximum amount of error ("threshold") to select a layer for optical monitoring is to have no more than about 0.2% error from the theoretical thickness $d_i$. The error calculation, in this regard, is discussed in more detail below with reference to 518 and 519. The layers that are simulated to exceed the threshold amount of error are flagged to have their deposition duration controlled by the best estimate of the deposition rate $r_i$ for that layer or from an average of the rates of the previous layers of like material (typically 10 to 20 of such layers).

After determining which layers are to be optically monitored at 504, actual deposition of the layers of the LWP filter begins at 505. In particular, the substrate is loaded into the deposition apparatus 400 of FIG. 4, the apparatus is pumped down to a vacuum, and deposition of the first layer (current layer i) is initiated at 506. The expected deposition time $t_i$ for layer i is calculated as the desired thickness $d_i$ divided by the estimated deposition rate $r_i$ for the layer or from an average of the rates of the previous layers of like material at 507. It should be noted, however, that calculation of the expected deposition time $t_i$ at 507 may be calculated prior to beginning actual deposition of the current layer i at 506.

After calculating the expected deposition time $t_i$, it is determined whether the current layer i has been identified as a layer to be optically monitored for controlled deposition duration. If the current layer has not been so identified, deposition of the current layer terminates when the expected deposition time $t_i$ from 507 expires, as shown at 509. After the expected deposition time $t_i$ has expired, processing advances to 521 where the next layer is queued up for deposition, as shown at 510.

If it is determined at 508 that the current layer i is to be optically monitored, the actual transmission $T_m$ is measured at 511 as a function of actual time transpired t until about 95% of the expected deposition time $t_i$ has elapsed. Once about 95% of $t_i$ has elapsed, a new deposition duration is calculated at 512–520. In particular, at 512, 513, and 514, using the $T_i$ vs. d at $\lambda_m$ curve from 502 and 503, a two-dimensional (2D) array of additional curves is generated by plotting the values of $T_i$ against a 2D array of time vectors $t_{jk}$. In particular, at 513, transmission $T_{ij}$ is generated by plotting $T_i$ against the values $t_j = d/r_j$, where $r_j$ represents, for each j, a deposition rate having a value close to the predicted value $r_i$. That is, the set of all $r_j$ values is a range of values surrounding the predicted value $r_i$. Accordingly, j is an index that counts the number of r values that come from the range surrounding the predicted value $r_i$. At 514, for each value of j, transmission $T_{ijk}$ is generated by plotting $T_{ij}$ against the values $t_{jk} = t_j + \Delta t_k$, where $\Delta t_k$ represents various values used for a uniform time shift.

At 515, it is determined whether there is more than one extremum in the curve $T_i$ vs. d at $\lambda_m$. If there is more than one extremum at 515, then each of the 2D array of curves generated at 512–514, is scaled in two ways at 516. First, the mid-point between the two extrema for each $T_{ijk}$ curve is scaled by a factor so that it equals the mid-point between the two extrema of the measured data $T_m$ vs. t. Second, the maximum and minimum values on each $T_{ijk}$ curve are scaled by scaling uniformly about their mean so that the difference between the maximum and minimum for each curve $T_{ijk}$ is the same as that on the measured curve $T_m$ vs. t. If there is one or no extremum at 515, then the mean of each $T_{ijk}$ curve is scaled at 517 by a uniform factor so that it is equal to the mean of the measured curve $T_m$ vs. t.

After scaling at 516 or 517, processing advances to 518 where error is calculated. For each of the 2D array of generated $T_{ijk}$ curves, the root-mean-square (RMS) error between each $T_{ijk}$ curve and the measured curve $T_m$ vs. t is computed. Typically this computation is performed only for data between about 10% and 95% of the expected deposition time $t_i$. Afterwards, the values of j and k that yield a minimum RMS error at 518 are identified at 519. Therefore, the curve $T_{ijk}$ vs. $t_{jk}$ is taken to be the best approximation of the actual curve $T_m$ vs. t for layer i. At 520, the curve $T_{ijk}$ vs. $t_{jk}$ is compared against the design curve $T_i$ vs. d at $\lambda_m$ from 502 and 503, and the time $t_{jk}$ at which the layer should be terminated is computed. When the measured time t reaches $t_{jk}$, the deposition for the optically monitored layer i is terminated.

After deposition of the current layer i has completed, the apparatus 400 of FIG. 4 is reconfigured at 521 to start depositing the material associated with layer i+1, and the process loops back to 506. However, if all layers of the filter have been deposited, the LWP filter is complete, and processing stops at 522.

Figure 6:
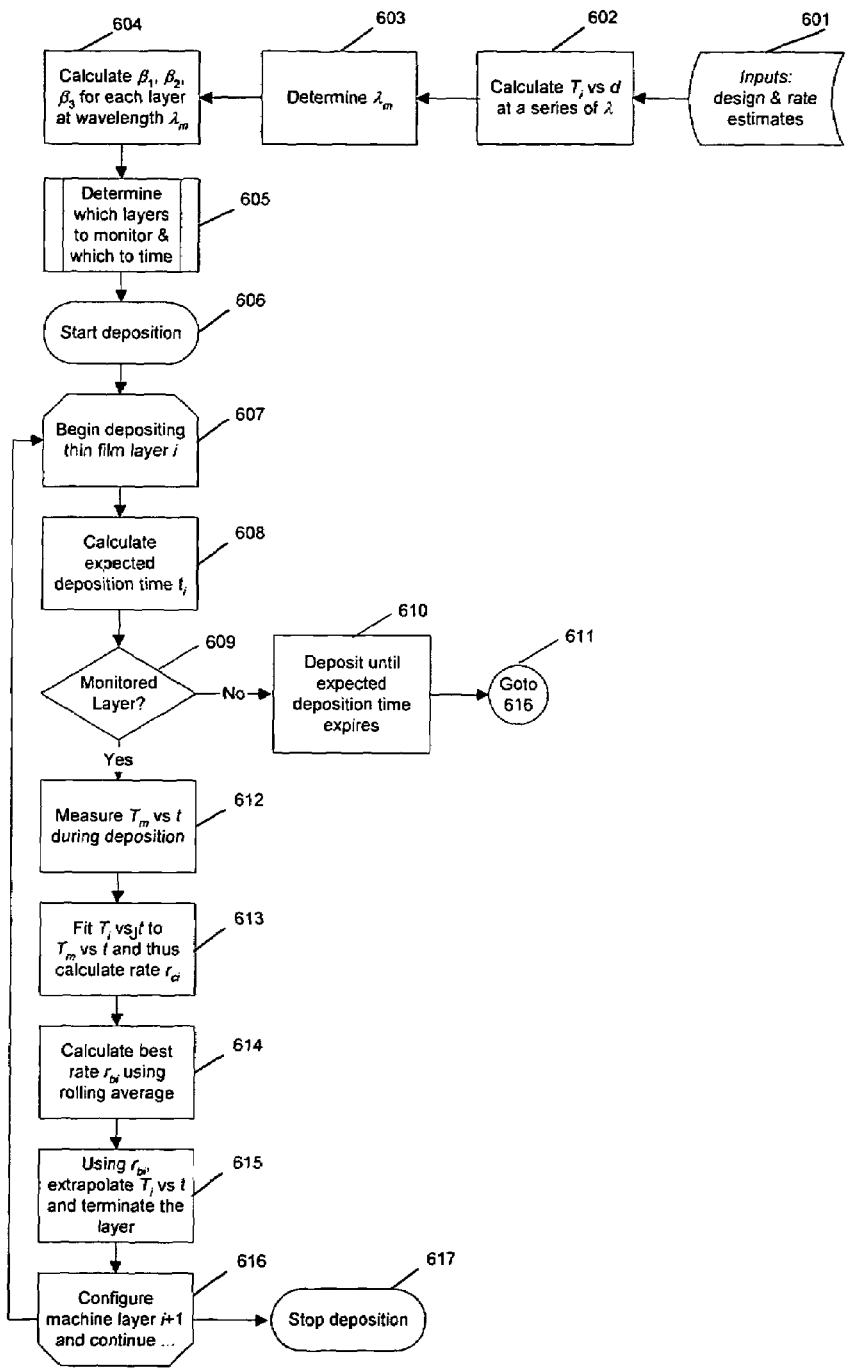
FIG. 6 is a process flow illustrating the process of manufacturing a short-wave-pass filter in accordance with the invention.

Turning now to FIG. 6, the process flow executed by the data processor 414 when manufacturing a short-wave-pass ("SWP") filter according to the exemplary embodiment of the present invention is described. The process illustrated with FIG. 6 is based on the inventor's observation that the inverse of the monitoring trace (i.e., the transmission of the monitoring light as a function of time) within each layer follows a sinusoidal pattern. As will be shown, only four parameters, $\beta_1$, $\beta_2$, $\beta_3$, and $\theta_{m+1}$, are needed to fully describe the behavior of the monitoring trace for each layer.

Assume that at the monitoring wavelength the incident medium, deposited materials, and substrate are all lossless (practically true). At normal incidence, each layer may be described by its characteristic matrix:

$$\begin{bmatrix} \cos\theta & -i\sin\theta/n \\ -in\sin\theta & \cos\theta \end{bmatrix} \quad (1)$$

where n is the refractive index of the layer, $\theta$ is the accumulated phase within the layer, and i in equations 1 through 8 (and only in these equations) is the square root of $-1$, or $i=\sqrt{-1}$. (It should be noted that although this specification is described in the context of light striking a filter at normal incidence, one skilled in the art will appreciate that this invention also applies to polarized light striking a filter at non-normal incidence.) $\theta$ is expressed as:

$$\theta = \frac{2\pi}{\lambda_m} nd \quad (2)$$

where d is the metric thickness of the layer and $\lambda_m$ is the monitoring wavelength. Assuming an assembly of m layers have already been deposited, the transmission of the monitoring light within the $(m+1)^{st}$ layer, the present layer, may be expressed as:

$$T = \frac{4n_a n_s}{H} \quad (3)$$

where T is the level of monitoring signal within the present layer (transmission), and $n_a$ and $n_s$ are the refractive indices of the incident medium and substrate, respectively. H is defined as:

$$H = \beta_1 + \beta_2 \cos 2\theta_{m+1} + \beta_3 \sin 2\theta_{m+1} \quad (4)$$

$\beta_1$, $\beta_2$, and $\beta_3$ are defined as:

$$\beta_1 = \frac{n_a^2 + n_{m+1}^2}{2}\left(|p|^2 + \frac{|q|^2}{n_{m+1}^2}\right) + 2n_a \mathrm{Re}(pq^*) \quad (5)$$

where Re(pq*) is the Real Part of the product of the complex number p and the complex conjugate of the complex number q. p and q are defined in equation (8) below.

$$\beta_2 = \frac{n_a^2 - n_{m+1}^2}{2}\left(|p|^2 - \frac{|q|^2}{n_{m+1}^2}\right) \quad (6)$$

$$\beta_3 = \left(\frac{n_a^2}{n_{m+1}} - n_{m+1}\right)\mathrm{Im}(p^*q) \quad (7)$$

where $\theta_l$ is accumulated phased in the $l_{th}$ layer. Im(pq*) is the Imaginary Part of the product of the complex conjugate of the number p and the complex number q. p and q are defined as:

$$\begin{bmatrix} p \\ q \end{bmatrix} = \prod_{l=1}^{m} \begin{bmatrix} \cos\theta_l & -i\sin\theta_l/n_l \\ -in_l\sin\theta_l & \cos\theta_l \end{bmatrix} \begin{bmatrix} 1 \\ n_s \end{bmatrix} \quad (8)$$

Based on the above equations, the relationship between the monitoring trace T and the accumulated phase $\theta_{m+1}$ within the present layer is established. The inverse of the monitoring trace is sinusoidal, as demonstrated by the expression for H. Further, only four parameters, $\beta_1$, $\beta_2$, $\beta_3$, and $\theta_{m+1}$, are needed to fully describe the behavior of the monitoring trace in the present layer. Because the thickness d=r×t, where r is the deposition rate and t is the deposition time, a relationship between T and r or t is also established. If the deposition rate is constant, the accumulated phase $\theta_{m+1}$ is proportional to the deposition rate. Therefore, during the deposition process, the deposition rate may be retrieved with high accuracy by fitting the in-situ measurement of the monitoring trace to the four parameters.

With this groundwork, the process of FIG. 6 will now be described in greater detail. However, prior to initiating the process of FIG. 6, a design for the SWP filter is prepared. The process of designing a SWP edge filter is very similar to that of LWP filter, with several exceptions. First, the initial structure is (0.5L H 0.5L)^N. Second, the shorter wavelength edge of the QW stopband should be aligned with the desired cutoff wavelength. Third, if the first layer next to the substrate is a low index layer, it should be removed. Finally, it is advantageous, but not necessary, to artificially increase the optical thickness of the first layer.

With the design of the SWP filter at hand, the design data, as well as deposition rate data are received as input at 601. The input data has the content and format described with reference to 501 in FIG. 5. At 602, the transmission curves $T_i$ vs. d at a series of wavelengths for each $i^{th}$ layer are calculated as described with reference to 502 in FIG. 5. Choosing the best monitoring wavelength $\lambda_m$ at 603 is similar to that described with reference to 503 in FIG. 5, except that it may be more advantageous to select $\lambda_m$ by taking an average of a series of wavelengths than it is for an LWP filter.

At 604, the $\beta$ parameters are calculated for each layer at wavelength $\lambda_m$ using equations (1) through (8) described above. At 605, a determination is made as to which layers should have their deposition duration controlled by optical monitoring and which layers should have their deposition duration timed using an expected deposition time $t_i$. Such determination is made by simulating the deposition of each layer and selecting the layers having the least amount of simulated error to be optically monitored. Deposition of the other layers will be timed using the expected deposition time $t_i$.

The simulation process occurs by executing the processes of 606 to 617 as described below. However, actual deposition does not occur at 606 and 607, the processing described at 609 is skipped, and instead of measuring $T_m$ vs. t at 612, it is generated. $T_m$ vs. t is generated by adding random noise to the theoretical data $T_i$ vs. d at $\lambda_m$ from 602 and 603. In the exemplary embodiment, 0.2% peak-to-peak random noise is used, and the maximum amount of error ("threshold") to select a layer for optical monitoring is to have no more than about 0.5% error from the theoretical resulting thickness $d_i$. The error calculation, in this regard, is described in more detail below with reference to 613. The layers that are simulated to exceed the threshold amount of error are flagged to have their deposition duration controlled by the best estimate of the deposition rate $r_i$ for that layer or from an average of the rates of the previous layers of like material (typically 10 to 20 such layers).

Having determined which layers are to be optically monitored at 605, deposition begins at 606. In particular, a substrate is loaded into the deposition apparatus 400, the apparatus 400 is pumped down to vacuum, and deposition of the first layer (current layer i) is initiated at 607. At 608, the expected deposition time $t_i$ for layer i is calculated as the desired thickness $d_i$ divided by the estimated deposition rate for the layer $r_i$ or from an average of the rates of the previous layers of like material. It should be noted, however, that calculation of the expected deposition time $t_i$ at 608 may be calculated prior to beginning actual deposition of the current layer i at 607.

At 609 it is determined whether the current layer i was identified as an optically monitored layer at 605. If not, deposition occurs until the expected deposition time $t_i$ expires, and the deposition apparatus is configured for deposition of the next layer, as shown at 610, 611, and 616. If it is determined that the current layer i is an optically monitored layer at 609, the transmission $T_m$ of the current layer is measured at 612 as a function of actual time t transpired, thereby producing a measured curve $T_m$ vs. t, until about 95% of time $t_i$ has elapsed. Once about 95% of the time $t_i$ has elapsed, a new layer time is calculated at 613 to 615.

To elaborate, at 613, $T_i$ vs. t (where t=d/r and $T_i$ vs. d at $\lambda_m$ was calculated and selected at 602 and 603, respectively) is fit to the measured curve $T_m$ vs. t from 612. The $T_i$ vs. t curve is fit to the measured curve $T_m$ vs. t by using a function that minimizes the error between the two curves by varying $\beta_1$, $\beta_2$, $\beta_3$, and the deposition rate r. An example of such a function is the Levenberg-Marquardt method implemented under the name "mrqmin( )" in the book *Numerical Recipes in C: The Art of Scientific Computing*, by Press, W. H.; Teukolsky, S. A.; Vetterling, W. T.; and Flannery, B. P., 2nd ed., Cambridge University Press, Cambridge, 1995. These calculations result in a calculated deposition rate for the current layer i, or $r_{ci}$.

Because of noise in the overall system and the sensitivity of the high-performance SWP filters to small layer-thickness errors, the calculated rates $r_{ci}$ tend to be insufficiently accurate if used directly. Therefore, a "best rate" for each layer, $r_{bi}$, is calculated at 614 as the average of the calculated rate $r_{ci}$ and calculated rates $r_{cj}, r_{c,j+2}, \ldots, r_{c,i-4}, r_{c,i-2}$ for a certain number (i−j)/2 of previous layers of the same material. In other words, the best rate is a rolling average of the current and previous rates from layers of like material within a certain window. Typically, this window includes about 20 layers.

At 615, the best rate $r_{bi}$ is used to calculate the layer termination time $t_i=d/r_{bi}$, and the layer is terminated when the clock reaches this time. Once deposition of the current layer is complete, the deposition apparatus 400 of FIG. 4 is reconfigured at 616 to start depositing the material associated with the next layer i+1, and the process loops back to 607. However, if all layers have been deposited, manufacturing of the SWP filter is compete, and the process ends at 617.

Although the exemplary methods have been described in the context of manufacturing optical edge filters, those skilled in the art will appreciate that such methods apply to manufacturing other types of optical filters, or may easily be modified to manufacture other types of optical filters. For instance, the methods are useful for any filter having even a single layer of critical thickness, such as a Fabry-Perot interferometer, where the layer of critical thickness is the resonance cavity. Further, although the exemplary methods are disclosed as having a particular sequence of events, one skilled in the art will appreciate that many of these events may occur in a different order without departing from the scope of the invention. Accordingly, the methods of the present invention are not limited to producing optical edge filters and are not limited to the particular ordering of events described.

C. The Improved Filters

Figure 3:
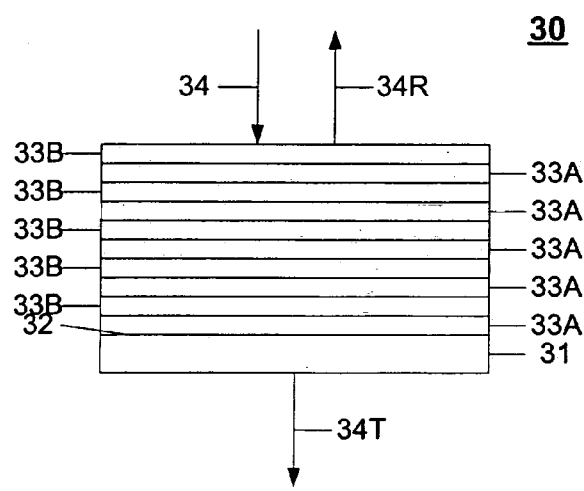
FIG. 3 is a schematic drawing of an idealized optical edge filter.

The improved filters have the general structure schematically illustrated in FIG. 3 but are made by the processes described herein in connection with FIGS. 5 and 6. In essence, the filters comprise a transparent substrate advantageously having a pair of optically flat planar major surfaces and a plurality of alternating layers of relatively high index and relatively low index materials. The materials are hard oxide coating materials such as $SiO_2$, $Ta_2O_5$, $Nb_2O_5$, $HfO_2$, $TiO_2$, and $Al_2O_5$.

The filters differ from conventional edge filters primarily in the number of layers (typically more than 100) and in that the thicknesses of layers deposited are controlled by the processes of FIGS. 5 and 6 to produce an edge steepness less than about 0.8%. The edge steepness, in this regard, is measured by dividing (a) the edge width from the 50% transmission wavelength to the optical density 6 ("OD6") wavelength by (b) the 50% transmission wavelength. Accordingly, lower steepness values indicate greater slope. Optical density ("OD") is a measure of the blockage encountered by impinging light and is defined as follows:

$$OD=-\log_{10}(T) \qquad (9)$$

where T is the transmittance having a value between zero and one. OD6 therefore corresponds to a transmittance of $10^{-6}$.

Advantageously the edge steepness, as defined above, is less than about 0.463%. However, the edge steepness may be increased if necessary. In addition, the filters so made exhibit an average transmission above about 93% and preferably above at least 95% with ripple below about 2% in the operating range. In the case of a filter for a 532 nanometer laser line, the operating range is approximately 200 nm from the wavelength at which the filter reaches full transmission. One skilled in the art will appreciate that the operating range is larger with filters for laser lines at higher wavelengths. Transmission of the filters does not drop below 93% and preferably 95% in the operating range. The filters thus provide performance exceeding that of the highest performing conventional soft-coating filters with a more robust and durable hard-coated structure.

The filters can be constructed with an edge wavelength as short as 325 nm and as long as 1064 nm. It is contemplated that this range may be extended from as low as 250 nm to as high as 2,000 nm using the materials listed above.

The invention can now be more clearly understood by consideration of the following specific examples.

EXAMPLE 1

Long-Wave-Pass Edge Filter

A steep-edge LWP filter for a 532 nanometer laser line was designed and fabricated in accordance with the LWP design strategy described above. The filter is to block the 532 nanometer laser light and light of lesser wavelength but to transmit light of longer wavelength. Appendix A gives the layer structure of the design. The optical thickness is given in units of quarter wavelengths (QWs) at the monitoring wavelength of 568 nanometers. The layers are counted from the substrate outward toward air. The substrate is BK7 glass, marketed by vendors such as Schott Glass. The design has 180 layers with a total metric thickness of 12.7 micrometers.

Figure 7:
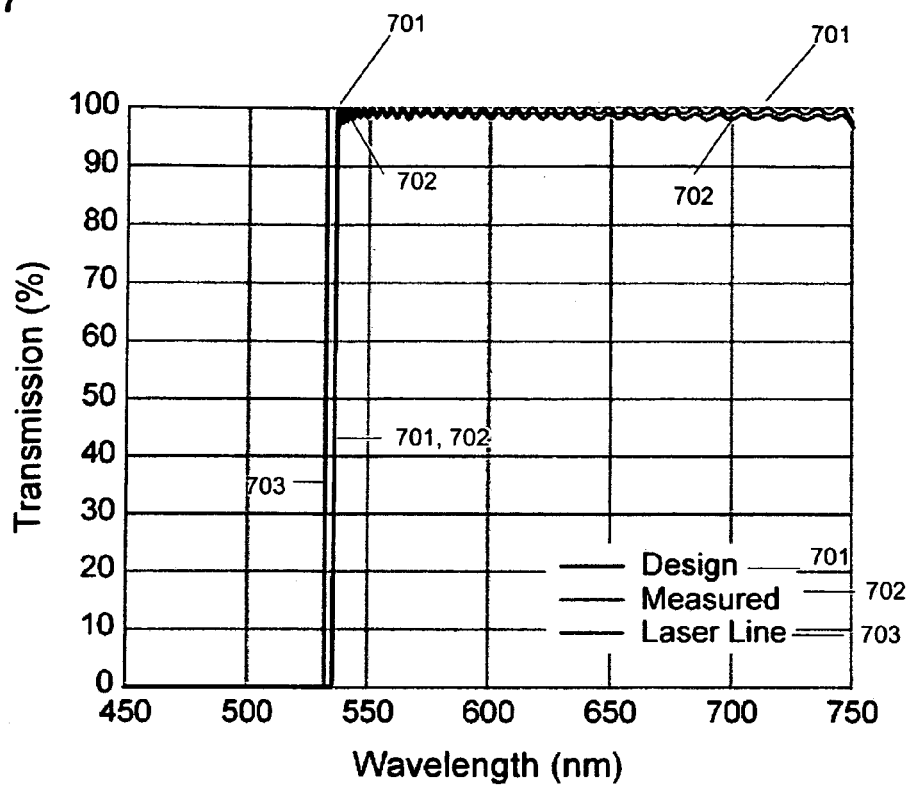
FIGS. 7 and 8 are transmission and optical density spectra, respectively, of an LWP filter fabricated in accordance with the invention.

FIG. 7 shows the theoretical and measured transmission spectra of the resulting 532 nm LWP edge filter in accordance with the invention. Curve 701 is the theoretical spectrum, curve 702 is the measured spectrum and curve 703 is the laser wavelength line at 532 nm.

Figure 8:
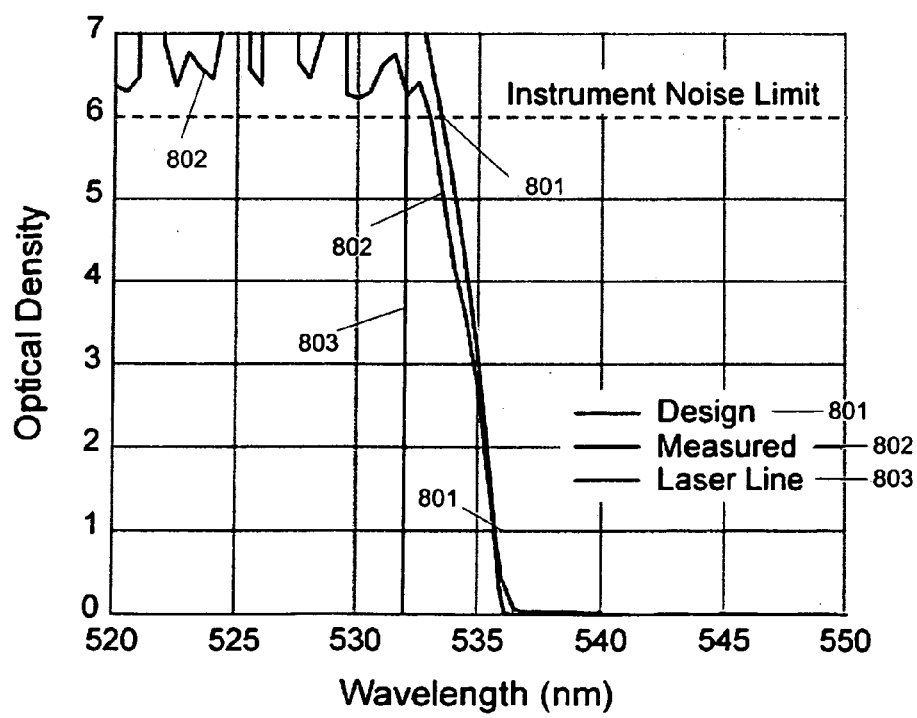

FIG. 8 illustrates the optical density spectrum of the 532 nm LWP filter. As previously discussed, optical density (OD) is a measure of the blockage encountered by impinging light. Curve 801 is the theoretical OD spectrum, curve 802 is the measured OD spectrum, and curve 803 is the 532 nm laser line. It is noteworthy that the filter edge is so steep that it is difficult to measure with standard spectrophotometry equipment. The apparent "kink" between OD3 and 4 is not real, but rather is produced by the measuring instrument.

EXAMPLE 2

Short-Wave-Pass Edge Filter

A steep-edge SWP filter was designed and fabricated in accordance with the SWP design strategy described above. The filter is to block the 532 nanometer laser light and light of greater wavelength but to transmit light of shorter wavelength. Appendix B provides the layer structure of the design. The optical thickness is given in QWs at the monitoring wavelength of 510 nm. The substrate is BK7 glass. The design has 180 layers with a total metric thickness of 15.1 micrometers.

Figure 9:
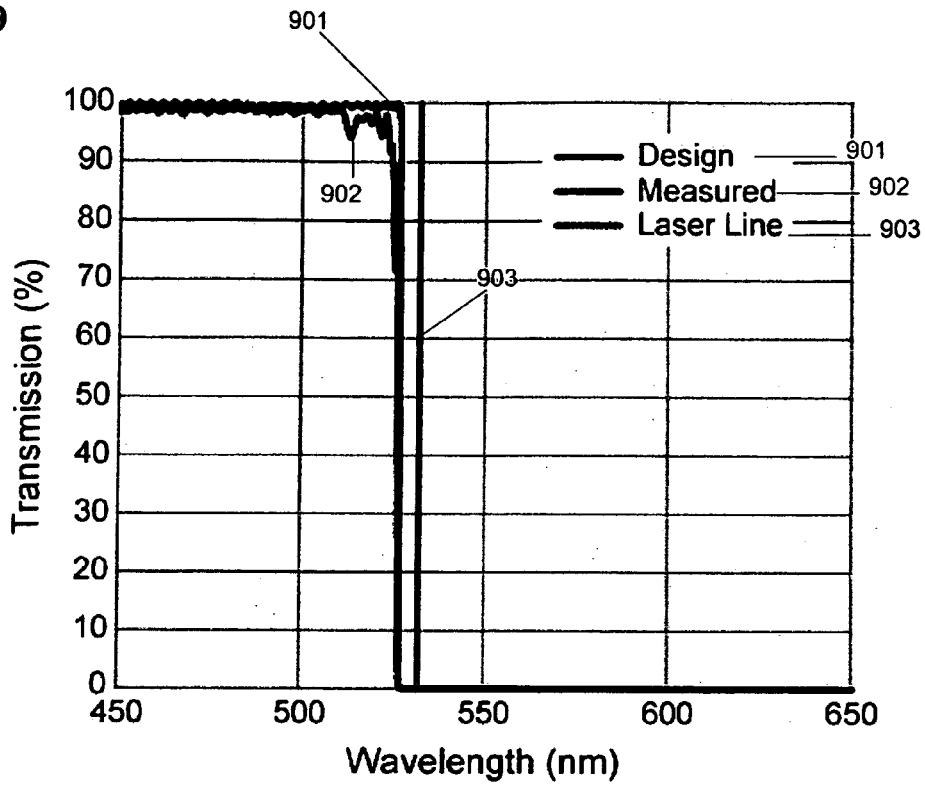
FIGS. 9 and 10 are transmission and optical density spectra, respectively, of an SWP filter fabricated in accordance with the invention.

FIG. 9 illustrates the theoretical and measured transmission spectra 901 and 902, respectively, of the realized SWP filter. The laser line at 532 nm is shown at 903.

Figure 10:
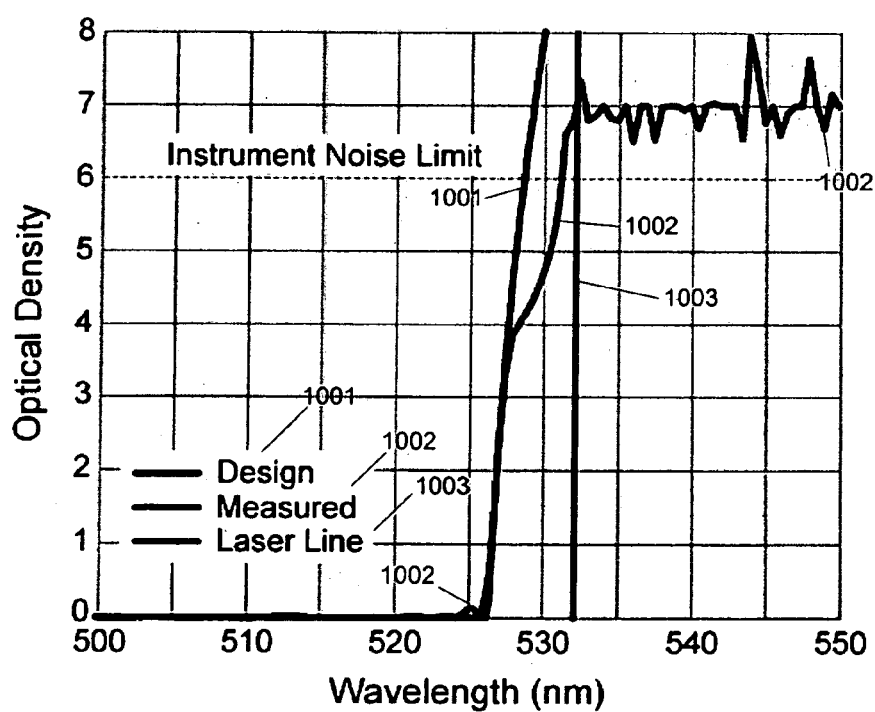

FIG. 10 shows the theoretical and measured optical density spectra 1001 and 1002, respectively, and the laser line 1003. The apparent "kink" that occurs between about OD 4 and 5 is due to the limitations of the measuring instrument, not the filter.

Comparison of the Inventive Filters with Conventional Filters

As compared with conventional edge filters, the filters of the invention provide substantially higher edge steepness and passband transmission. Table 1 below presents a comparison between the inventive filters and the best known examples of conventional soft-coated and hard-coated thin-film edge filters. The data in Table 1 are from filters designed to block a 532 nm laser, where the 50% transmission wavelength is 540 nm. Accordingly, steepness (in percentage) is calculated as Edge Width divided by 540 nm.

TABLE 1

|  | Hard-Coated | Soft-Coated | Inventive |
| --- | --- | --- | --- |
| Edge Width (50% to OD4) | ≈3 nm* | ≈4 nm* | <1.4 nm |
| Edge Steepness (50% to OD4) | ≈0.556% | ≈0.741% | <0.259% |
| Edge Width (50% to OD6) | ≈5 nm* | ≈6 nm** | <2.5 nm |
| Edge Steepness (50% to OD6) | ≈0.926% | ≈1.111% | <0.463% |

TABLE 1-continued

|  | Hard-Coated | Soft-Coated | Inventive |
| --- | --- | --- | --- |
| Laser-Line Attenuation (OD) | >6.0 | >5.0 | >6.0 |
| Average Transmission | >90% | >85% | >95% |

*Estimated specification
**Edge width for 50% to OD5 (necessarily less than Edge Width for 50% to OD6)

As can be seen from the table, the filters of the present invention provide an improvement in edge steepness and a reduction of optical loss in the transmission band (optical loss defined as 100%−Average Transmission).

In addition, the inventive filters provide a substantial improvement in reliability and durability over soft-coated thin-film filters (the highest performing conventional filters) because the inventive filters are made exclusively with hard oxide glass, whereas soft-coated filters contain soft salts and organic materials susceptible to damage by humidity and temperature extremes.

D. Applications of the Filters

Figure 1A:
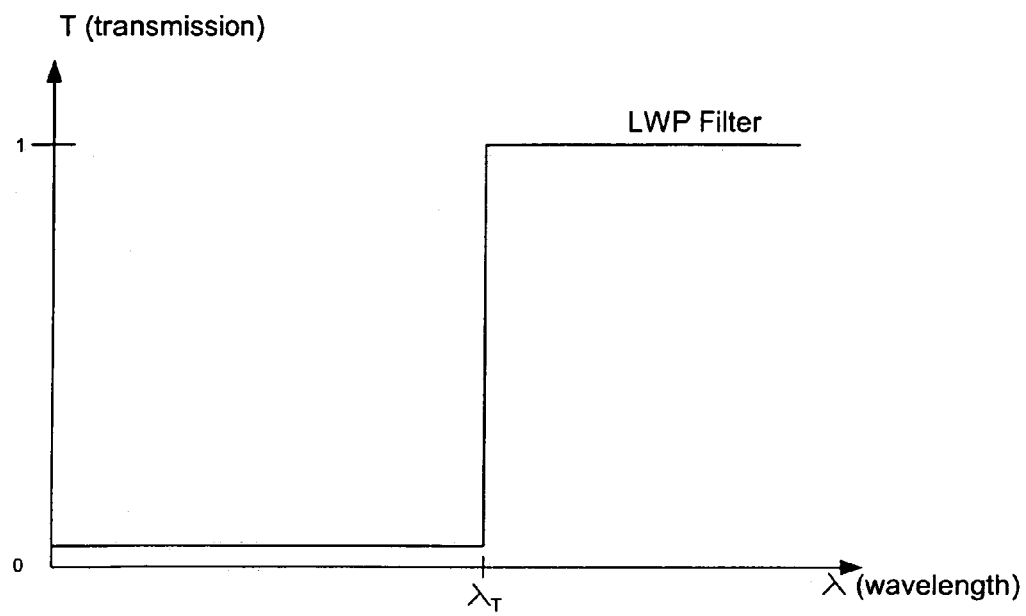
FIGS. 1A and 1B are schematic graphical illustrations showing the spectral transmission of long-wave-pass and short-wave-pass optical edge filters, respectively.
Figure 1B:
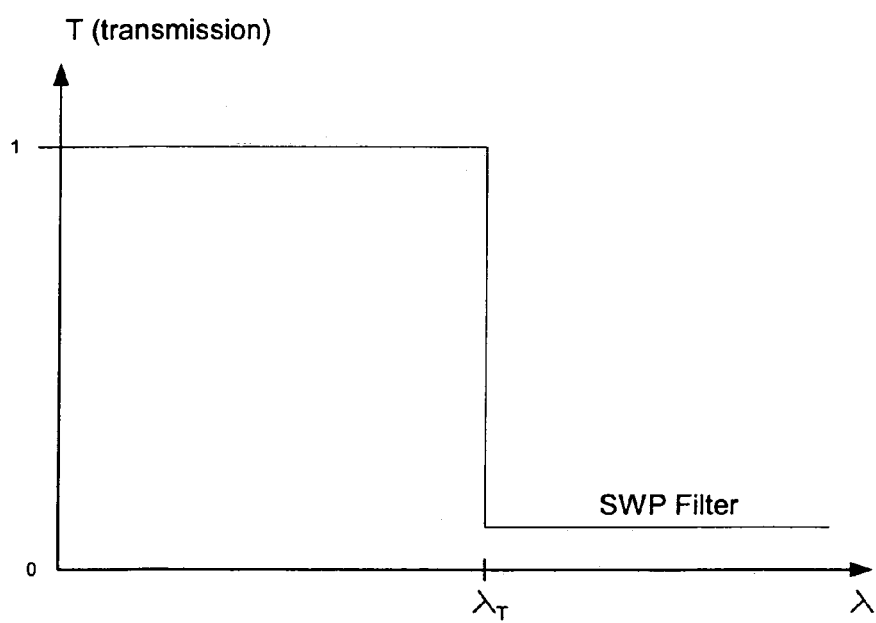
Figure 2:
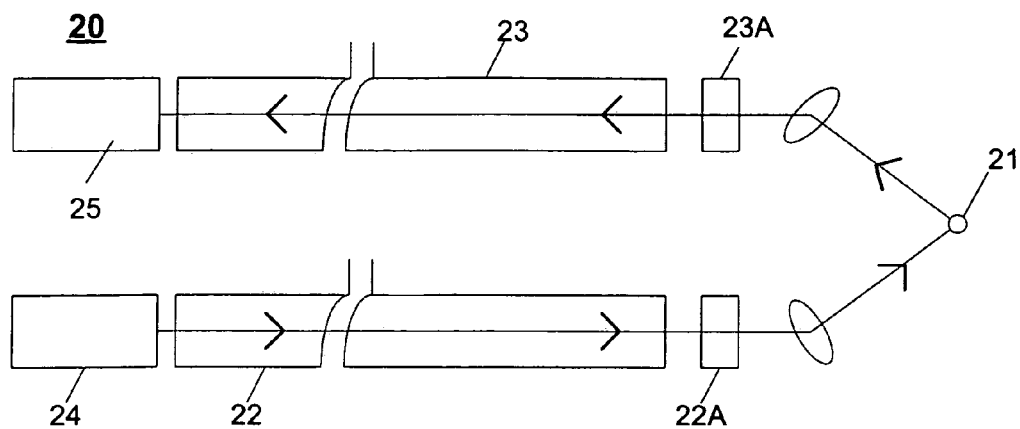
FIG. 2 is a schematic diagram of a conventional Raman probe designed to excite and collect the long wavelength portion of Raman-shifted light from a sample.

The inventive filters can improve the performance of a variety of optical analysis systems that excite a sample of material with light of a first wavelength to produce a measurable or viewable response of light at a second wavelength different from the first. Such systems, which include Raman spectroscopy and fluorescence microscopy, are typically of the construction schematically shown in FIG. 2. They comprise a source of excitation light, an optical path coupling the excitation light to the sample, and a first filter in the path between the source and the sample for blocking light at some wavelengths different from the excitation light. They also include an optical path coupling the optical response light from the sample to an analyzer or viewer, and a second filter in the path between the sample and the analyzer or viewer for blocking some light other than the optical response. As previously discussed, the first and/or second filters can be long-wave-pass and/or short-wave-pass optical edge filters. It is also possible that one of the filters, e.g. the second, can be a notch filter.

One or more optical edge filters in accordance with the invention can substantially improve the performance of such optical analytical systems. The greater steepness of edge slope permits return of response wavelengths closer to the excitation wavelength providing an increase in the information content of the returned response. The reduction in transmission loss means that the enhanced information return response will be at higher brightness, and the greater hardness and durability of the inventive filters permits a more robust and versatile instrument.

It is to be understood that the exemplary embodiment is merely illustrative of the present invention and that many variations of the above-described embodiment can be devised by one skilled in the art without departing from the scope of the invention. It is therefore intended that all such variations be included within the scope of the following claims and their equivalents.

APPENDIX A

| Layer # | Material | Optical Thickness | Metric Thickness (nm) |
| --- | --- | --- | --- |
| 1 | Ta2O5 | 2.5790 | 171.93 |
| 2 | SiO2 | 0.7851 | 74.97 |

APPENDIX A-continued

| Layer # | Material | Optical Thickness | Metric Thickness (nm) |
|---|---|---|---|
| 3 | Ta2O5 | 0.7323 | 48.82 |
| 4 | SiO2 | 0.7163 | 68.40 |
| 5 | Ta2O5 | 0.8253 | 55.02 |
| 6 | SiO2 | 0.8398 | 80.19 |
| 7 | Ta2O5 | 0.8490 | 56.60 |
| 8 | SiO2 | 0.7960 | 76.01 |
| 9 | Ta2O5 | 0.8058 | 53.72 |
| 10 | SiO2 | 0.8080 | 77.15 |
| 11 | Ta2O5 | 0.8513 | 56.75 |
| 12 | SiO2 | 0.8356 | 79.79 |
| 13 | Ta2O5 | 0.8351 | 55.67 |
| 14 | SiO2 | 0.8029 | 76.67 |
| 15 | Ta2O5 | 0.8280 | 55.20 |
| 16 | SiO2 | 0.8286 | 79.12 |
| 17 | Ta2O5 | 0.8510 | 56.73 |
| 18 | SiO2 | 0.8276 | 79.03 |
| 19 | Ta2O5 | 0.8295 | 55.30 |
| 20 | SiO2 | 0.8124 | 77.57 |
| 21 | Ta2O5 | 0.8402 | 56.01 |
| 22 | SiO2 | 0.8333 | 79.57 |
| 23 | Ta2O5 | 0.8466 | 56.44 |
| 24 | SiO2 | 0.8209 | 78.39 |
| 25 | Ta2O5 | 0.8324 | 55.49 |
| 26 | SiO2 | 0.8202 | 78.32 |
| 27 | Ta2O5 | 0.8441 | 56.27 |
| 28 | SiO2 | 0.8337 | 79.61 |
| 29 | Ta2O5 | 0.8420 | 56.13 |
| 30 | SiO2 | 0.8193 | 78.23 |
| 31 | Ta2O5 | 0.8345 | 55.63 |
| 32 | SiO2 | 0.8262 | 78.89 |
| 33 | Ta2O5 | 0.8475 | 56.50 |
| 34 | SiO2 | 0.8296 | 79.22 |
| 35 | Ta2O5 | 0.8385 | 55.90 |
| 36 | SiO2 | 0.8197 | 78.27 |
| 37 | Ta2O5 | 0.8379 | 55.86 |
| 38 | SiO2 | 0.8305 | 79.30 |
| 39 | Ta2O5 | 0.8472 | 56.48 |
| 40 | SiO2 | 0.8259 | 78.86 |
| 41 | Ta2O5 | 0.8363 | 55.75 |
| 42 | SiO2 | 0.8223 | 78.52 |
| 43 | Ta2O5 | 0.8424 | 56.16 |
| 44 | SiO2 | 0.8311 | 79.36 |
| 45 | Ta2O5 | 0.8432 | 56.21 |
| 46 | SiO2 | 0.8242 | 78.70 |
| 47 | Ta2O5 | 0.8375 | 55.83 |
| 48 | SiO2 | 0.8250 | 78.78 |
| 49 | Ta2O5 | 0.8439 | 56.26 |
| 50 | SiO2 | 0.8305 | 79.30 |
| 51 | Ta2O5 | 0.8417 | 56.11 |
| 52 | SiO2 | 0.8223 | 78.52 |
| 53 | Ta2O5 | 0.8391 | 55.94 |
| 54 | SiO2 | 0.8276 | 79.03 |
| 55 | Ta2O5 | 0.8445 | 56.30 |
| 56 | SiO2 | 0.8282 | 79.08 |
| 57 | Ta2O5 | 0.8402 | 56.01 |
| 58 | SiO2 | 0.8237 | 78.65 |
| 59 | Ta2O5 | 0.8405 | 56.03 |
| 60 | SiO2 | 0.8285 | 79.11 |
| 61 | Ta2O5 | 0.8447 | 56.31 |
| 62 | SiO2 | 0.8264 | 78.91 |
| 63 | Ta2O5 | 0.8391 | 55.94 |
| 64 | SiO2 | 0.8242 | 78.70 |
| 65 | Ta2O5 | 0.8433 | 56.22 |
| 66 | SiO2 | 0.8284 | 79.10 |
| 67 | Ta2O5 | 0.8436 | 56.24 |
| 68 | SiO2 | 0.8256 | 78.83 |
| 69 | Ta2O5 | 0.8382 | 55.88 |
| 70 | SiO2 | 0.8260 | 78.87 |
| 71 | Ta2O5 | 0.8445 | 56.30 |
| 72 | SiO2 | 0.8279 | 79.05 |
| 73 | Ta2O5 | 0.8424 | 56.16 |
| 74 | SiO2 | 0.8242 | 78.70 |
| 75 | Ta2O5 | 0.8400 | 56.00 |
| 76 | SiO2 | 0.8276 | 79.03 |
| 77 | Ta2O5 | 0.8445 | 56.30 |
| 78 | SiO2 | 0.8266 | 78.93 |
| 79 | Ta2O5 | 0.8402 | 56.01 |
| 80 | SiO2 | 0.8246 | 78.74 |
| 81 | Ta2O5 | 0.8432 | 56.21 |
| 82 | SiO2 | 0.8275 | 79.02 |
| 83 | Ta2O5 | 0.8429 | 56.19 |
| 84 | SiO2 | 0.8262 | 78.89 |
| 85 | Ta2O5 | 0.8402 | 56.01 |
| 86 | SiO2 | 0.8265 | 78.92 |
| 87 | Ta2O5 | 0.8417 | 56.11 |
| 88 | SiO2 | 0.8282 | 79.08 |
| 89 | Ta2O5 | 0.8435 | 56.23 |
| 90 | SiO2 | 0.8244 | 78.72 |
| 91 | Ta2O5 | 0.8399 | 55.99 |
| 92 | SiO2 | 0.8275 | 79.02 |
| 93 | Ta2O5 | 0.8436 | 56.24 |
| 94 | SiO2 | 0.8275 | 79.02 |
| 95 | Ta2O5 | 0.8403 | 56.02 |
| 96 | SiO2 | 0.8252 | 78.80 |
| 97 | Ta2O5 | 0.8423 | 56.15 |
| 98 | SiO2 | 0.8278 | 79.04 |
| 99 | Ta2O5 | 0.8426 | 56.17 |
| 100 | SiO2 | 0.8260 | 78.87 |
| 101 | Ta2O5 | 0.8405 | 56.03 |
| 102 | SiO2 | 0.8257 | 78.84 |
| 103 | Ta2O5 | 0.8444 | 56.29 |
| 104 | SiO2 | 0.8268 | 78.95 |
| 105 | Ta2O5 | 0.8414 | 56.09 |
| 106 | SiO2 | 0.8256 | 78.83 |
| 107 | Ta2O5 | 0.8412 | 56.08 |
| 108 | SiO2 | 0.8268 | 78.95 |
| 109 | Ta2O5 | 0.8433 | 56.22 |
| 110 | SiO2 | 0.8266 | 78.93 |
| 111 | Ta2O5 | 0.8409 | 56.06 |
| 112 | SiO2 | 0.8259 | 78.86 |
| 113 | Ta2O5 | 0.8424 | 56.16 |
| 114 | SiO2 | 0.8266 | 78.93 |
| 115 | Ta2O5 | 0.8424 | 56.16 |
| 116 | SiO2 | 0.8265 | 78.92 |
| 117 | Ta2O5 | 0.8406 | 56.04 |
| 118 | SiO2 | 0.8260 | 78.87 |
| 119 | Ta2O5 | 0.8426 | 56.17 |
| 120 | SiO2 | 0.8275 | 79.02 |
| 121 | Ta2O5 | 0.8421 | 56.14 |
| 122 | SiO2 | 0.8249 | 78.77 |
| 123 | Ta2O5 | 0.8405 | 56.03 |
| 124 | SiO2 | 0.8270 | 78.97 |
| 125 | Ta2O5 | 0.8424 | 56.16 |
| 126 | SiO2 | 0.8282 | 79.08 |
| 127 | Ta2O5 | 0.8400 | 56.00 |
| 128 | SiO2 | 0.8245 | 78.73 |
| 129 | Ta2O5 | 0.8421 | 56.14 |
| 130 | SiO2 | 0.8273 | 79.00 |
| 131 | Ta2O5 | 0.8432 | 56.21 |
| 132 | SiO2 | 0.8257 | 78.84 |
| 133 | Ta2O5 | 0.8397 | 55.98 |
| 134 | SiO2 | 0.8246 | 78.74 |
| 135 | Ta2O5 | 0.8429 | 56.19 |
| 136 | SiO2 | 0.8288 | 79.14 |
| 137 | Ta2O5 | 0.8412 | 56.08 |
| 138 | SiO2 | 0.8239 | 78.67 |
| 139 | Ta2O5 | 0.8403 | 56.02 |
| 140 | SiO2 | 0.8261 | 78.88 |
| 141 | Ta2O5 | 0.8423 | 56.15 |
| 142 | SiO2 | 0.8283 | 79.09 |
| 143 | Ta2O5 | 0.8409 | 56.06 |
| 144 | SiO2 | 0.8220 | 78.49 |
| 145 | Ta2O5 | 0.8396 | 55.97 |
| 146 | SiO2 | 0.8283 | 79.09 |
| 147 | Ta2O5 | 0.8441 | 56.27 |
| 148 | SiO2 | 0.8262 | 78.89 |
| 149 | Ta2O5 | 0.8379 | 55.86 |
| 150 | SiO2 | 0.8197 | 78.27 |
| 151 | Ta2O5 | 0.8429 | 56.19 |
| 152 | SiO2 | 0.8307 | 79.32 |
| 153 | Ta2O5 | 0.8420 | 56.13 |
| 154 | SiO2 | 0.8217 | 78.46 |
| 155 | Ta2O5 | 0.8357 | 55.71 |
| 156 | SiO2 | 0.8223 | 78.52 |

APPENDIX A-continued

| Layer # | Material | Optical Thickness | Metric Thickness (nm) |
|---|---|---|---|
| 157 | Ta2O5 | 0.8450 | 56.33 |
| 158 | SiO2 | 0.8308 | 79.33 |
| 159 | Ta2O5 | 0.8372 | 55.81 |
| 160 | SiO2 | 0.8161 | 77.93 |
| 161 | Ta2O5 | 0.8354 | 55.69 |
| 162 | SiO2 | 0.8263 | 78.90 |
| 163 | Ta2O5 | 0.8474 | 56.49 |
| 164 | SiO2 | 0.8253 | 78.81 |
| 165 | Ta2O5 | 0.8288 | 55.25 |
| 166 | SiO2 | 0.8103 | 77.37 |
| 167 | Ta2O5 | 0.8391 | 55.94 |
| 168 | SiO2 | 0.8318 | 79.43 |
| 169 | Ta2O5 | 0.8423 | 56.15 |
| 170 | SiO2 | 0.8083 | 77.18 |
| 171 | Ta2O5 | 0.8178 | 54.52 |
| 172 | SiO2 | 0.8087 | 77.22 |
| 173 | Ta2O5 | 0.8436 | 56.24 |
| 174 | SiO2 | 0.8224 | 78.53 |
| 175 | Ta2O5 | 0.8187 | 54.58 |
| 176 | SiO2 | 0.7696 | 73.49 |
| 177 | Ta2O5 | 0.8021 | 53.47 |
| 178 | SiO2 | 0.7686 | 73.39 |
| 179 | Ta2O5 | 0.7329 | 48.86 |
| 180 | SiO2 | 1.5674 | 149.67 |

APPENDIX B

| Layer # | Material | Optical Thickness | Metric Thickness (nm) |
|---|---|---|---|
| 1 | Ta2O5 | 1.5070 | 89.32 |
| 2 | SiO2 | 1.1544 | 98.77 |
| 3 | Ta2O5 | 1.3342 | 79.08 |
| 4 | SiO2 | 1.1510 | 98.48 |
| 5 | Ta2O5 | 1.1930 | 70.71 |
| 6 | SiO2 | 1.1508 | 98.46 |
| 7 | Ta2O5 | 1.2262 | 72.68 |
| 8 | SiO2 | 1.1508 | 98.46 |
| 9 | Ta2O5 | 1.1812 | 70.01 |
| 10 | SiO2 | 1.1501 | 98.40 |
| 11 | Ta2O5 | 1.1692 | 69.30 |
| 12 | SiO2 | 1.1503 | 98.42 |
| 13 | Ta2O5 | 1.1852 | 70.25 |
| 14 | SiO2 | 1.1503 | 98.42 |
| 15 | Ta2O5 | 1.1635 | 68.96 |
| 16 | SiO2 | 1.1500 | 98.39 |
| 17 | Ta2O5 | 1.1530 | 68.34 |
| 18 | SiO2 | 1.1501 | 98.40 |
| 19 | Ta2O5 | 1.1765 | 69.73 |
| 20 | SiO2 | 1.1503 | 98.42 |
| 21 | Ta2O5 | 1.1721 | 69.47 |
| 22 | SiO2 | 1.1500 | 98.39 |
| 23 | Ta2O5 | 1.1534 | 68.36 |
| 24 | SiO2 | 1.1500 | 98.39 |
| 25 | Ta2O5 | 1.1621 | 68.88 |
| 26 | SiO2 | 1.1501 | 98.40 |
| 27 | Ta2O5 | 1.1635 | 68.96 |
| 28 | SiO2 | 1.1500 | 98.39 |
| 29 | Ta2O5 | 1.1483 | 68.06 |
| 30 | SiO2 | 1.1500 | 98.39 |
| 31 | Ta2O5 | 1.1608 | 68.80 |
| 32 | SiO2 | 1.1501 | 98.40 |
| 33 | Ta2O5 | 1.1699 | 69.34 |
| 34 | SiO2 | 1.1501 | 98.40 |
| 35 | Ta2O5 | 1.1555 | 68.49 |
| 36 | SiO2 | 1.1500 | 98.39 |
| 37 | Ta2O5 | 1.1574 | 68.60 |
| 38 | SiO2 | 1.1501 | 98.40 |
| 39 | Ta2O5 | 1.1665 | 69.14 |
| 40 | SiO2 | 1.1501 | 98.40 |
| 41 | Ta2O5 | 1.1544 | 68.42 |
| 42 | SiO2 | 1.1499 | 98.38 |
| 43 | Ta2O5 | 1.1505 | 68.19 |

APPENDIX B -continued

| Layer # | Material | Optical Thickness | Metric Thickness (nm) |
|---|---|---|---|
| 44 | SiO2 | 1.1500 | 98.39 |
| 45 | Ta2O5 | 1.1640 | 68.99 |
| 46 | SiO2 | 1.1501 | 98.40 |
| 47 | Ta2O5 | 1.1591 | 68.70 |
| 48 | SiO2 | 1.1500 | 98.39 |
| 49 | Ta2O5 | 1.1517 | 68.26 |
| 50 | SiO2 | 1.1500 | 98.39 |
| 51 | Ta2O5 | 1.1625 | 68.90 |
| 52 | SiO2 | 1.1501 | 98.40 |
| 53 | Ta2O5 | 1.1608 | 68.80 |
| 54 | SiO2 | 1.1500 | 98.39 |
| 55 | Ta2O5 | 1.1508 | 68.21 |
| 56 | SiO2 | 1.1500 | 98.39 |
| 57 | Ta2O5 | 1.1589 | 68.69 |
| 58 | SiO2 | 1.1501 | 98.40 |
| 59 | Ta2O5 | 1.1628 | 68.92 |
| 60 | SiO2 | 1.1500 | 98.39 |
| 61 | Ta2O5 | 1.1534 | 68.36 |
| 62 | SiO2 | 1.1500 | 98.39 |
| 63 | Ta2O5 | 1.1567 | 68.56 |
| 64 | SiO2 | 1.1500 | 98.39 |
| 65 | Ta2O5 | 1.1623 | 68.89 |
| 66 | SiO2 | 1.1500 | 98.39 |
| 67 | Ta2O5 | 1.1544 | 68.42 |
| 68 | SiO2 | 1.1500 | 98.39 |
| 69 | Ta2O5 | 1.1549 | 68.45 |
| 70 | SiO2 | 1.1500 | 98.39 |
| 71 | Ta2O5 | 1.1620 | 68.87 |
| 72 | SiO2 | 1.1500 | 98.39 |
| 73 | Ta2O5 | 1.1576 | 68.61 |
| 74 | SiO2 | 1.1500 | 98.39 |
| 75 | Ta2O5 | 1.1544 | 68.42 |
| 76 | SiO2 | 1.1500 | 98.39 |
| 77 | Ta2O5 | 1.1596 | 68.73 |
| 78 | SiO2 | 1.1500 | 98.39 |
| 79 | Ta2O5 | 1.1582 | 68.65 |
| 80 | SiO2 | 1.1500 | 98.39 |
| 81 | Ta2O5 | 1.1537 | 68.38 |
| 82 | SiO2 | 1.1500 | 98.39 |
| 83 | Ta2O5 | 1.1576 | 68.61 |
| 84 | SiO2 | 1.1500 | 98.39 |
| 85 | Ta2O5 | 1.1608 | 68.80 |
| 86 | SiO2 | 1.1500 | 98.39 |
| 87 | Ta2O5 | 1.1562 | 68.53 |
| 88 | SiO2 | 1.1500 | 98.39 |
| 89 | Ta2O5 | 1.1561 | 68.52 |
| 90 | SiO2 | 1.1500 | 98.39 |
| 91 | Ta2O5 | 1.1604 | 68.78 |
| 92 | SiO2 | 1.1500 | 98.39 |
| 93 | Ta2O5 | 1.1576 | 68.61 |
| 94 | SiO2 | 1.1500 | 98.39 |
| 95 | Ta2O5 | 1.1537 | 68.38 |
| 96 | SiO2 | 1.1500 | 98.39 |
| 97 | Ta2O5 | 1.1591 | 68.70 |
| 98 | SiO2 | 1.1501 | 98.40 |
| 99 | Ta2O5 | 1.1603 | 68.77 |
| 100 | SiO2 | 1.1500 | 98.39 |
| 101 | Ta2O5 | 1.1532 | 68.35 |
| 102 | SiO2 | 1.1500 | 98.39 |
| 103 | Ta2O5 | 1.1567 | 68.56 |
| 104 | SiO2 | 1.1501 | 98.40 |
| 105 | Ta2O5 | 1.1621 | 68.88 |
| 106 | SiO2 | 1.1500 | 98.39 |
| 107 | Ta2O5 | 1.1552 | 68.47 |
| 108 | SiO2 | 1.1500 | 98.39 |
| 109 | Ta2O5 | 1.1557 | 68.50 |
| 110 | SiO2 | 1.1500 | 98.39 |
| 111 | Ta2O5 | 1.1635 | 68.96 |
| 112 | SiO2 | 1.1501 | 98.40 |
| 113 | Ta2O5 | 1.1569 | 68.57 |
| 114 | SiO2 | 1.1500 | 98.39 |
| 115 | Ta2O5 | 1.1518 | 68.27 |
| 116 | SiO2 | 1.1500 | 98.39 |
| 117 | Ta2O5 | 1.1603 | 68.77 |
| 118 | SiO2 | 1.1501 | 98.40 |

-continued

APPENDIX B

| Layer # | Material | Optical Thickness | Metric Thickness (nm) |
|---|---|---|---|
| 119 | Ta2O5 | 1.1593 | 68.71 |
| 120 | SiO2 | 1.1500 | 98.39 |
| 121 | Ta2O5 | 1.1530 | 68.34 |
| 122 | SiO2 | 1.1500 | 98.39 |
| 123 | Ta2O5 | 1.1608 | 68.80 |
| 124 | SiO2 | 1.1501 | 98.40 |
| 125 | Ta2O5 | 1.1640 | 68.99 |
| 126 | SiO2 | 1.1500 | 98.39 |
| 127 | Ta2O5 | 1.1539 | 68.39 |
| 128 | SiO2 | 1.1500 | 98.39 |
| 129 | Ta2O5 | 1.1569 | 68.57 |
| 130 | SiO2 | 1.1501 | 98.40 |
| 131 | Ta2O5 | 1.1642 | 69.00 |
| 132 | SiO2 | 1.1501 | 98.40 |
| 133 | Ta2O5 | 1.1562 | 68.53 |
| 134 | SiO2 | 1.1500 | 98.39 |
| 135 | Ta2O5 | 1.1554 | 68.48 |
| 136 | SiO2 | 1.1500 | 98.39 |
| 137 | Ta2O5 | 1.1643 | 69.01 |
| 138 | SiO2 | 1.1501 | 98.40 |
| 139 | Ta2O5 | 1.1579 | 68.63 |
| 140 | SiO2 | 1.1500 | 98.39 |
| 141 | Ta2O5 | 1.1513 | 68.24 |
| 142 | SiO2 | 1.1500 | 98.39 |
| 143 | Ta2O5 | 1.1626 | 68.91 |
| 144 | SiO2 | 1.1501 | 98.40 |
| 145 | Ta2O5 | 1.1665 | 69.14 |
| 146 | SiO2 | 1.1501 | 98.40 |
| 147 | Ta2O5 | 1.1576 | 68.61 |
| 148 | SiO2 | 1.1500 | 98.39 |
| 149 | Ta2O5 | 1.1643 | 69.01 |
| 150 | SiO2 | 1.1501 | 98.40 |
| 151 | Ta2O5 | 1.1687 | 69.27 |
| 152 | SiO2 | 1.1501 | 98.40 |
| 153 | Ta2O5 | 1.1520 | 68.28 |
| 154 | SiO2 | 1.1499 | 98.38 |
| 155 | Ta2O5 | 1.1569 | 68.57 |
| 156 | SiO2 | 1.1501 | 98.40 |
| 157 | Ta2O5 | 1.1758 | 69.69 |
| 158 | SiO2 | 1.1502 | 98.41 |
| 159 | Ta2O5 | 1.1685 | 69.26 |
| 160 | SiO2 | 1.1501 | 98.40 |
| 161 | Ta2O5 | 1.1655 | 69.08 |
| 162 | SiO2 | 1.1502 | 98.41 |
| 163 | Ta2O5 | 1.1812 | 70.01 |
| 164 | SiO2 | 1.1503 | 98.42 |
| 165 | Ta2O5 | 1.1739 | 69.58 |
| 166 | SiO2 | 1.1501 | 98.40 |
| 167 | Ta2O5 | 1.1716 | 69.44 |
| 168 | SiO2 | 1.1505 | 98.43 |
| 169 | Ta2O5 | 1.2062 | 71.49 |
| 170 | SiO2 | 1.1507 | 98.45 |
| 171 | Ta2O5 | 1.2025 | 71.27 |
| 172 | SiO2 | 1.1506 | 98.44 |
| 173 | Ta2O5 | 1.2021 | 71.25 |
| 174 | SiO2 | 1.1512 | 98.49 |
| 175 | Ta2O5 | 1.2828 | 76.03 |
| 176 | SiO2 | 1.1521 | 98.57 |
| 177 | Ta2O5 | 1.3081 | 77.53 |
| 178 | SiO2 | 1.1524 | 98.60 |
| 179 | Ta2O5 | 1.3750 | 81.50 |
| 180 | SiO2 | 0.5780 | 49.45 |

What is claimed is:

1. A method of manufacturing an optical filter by determining when deposition of a layer of the optical filter is to terminate, the method comprising:

calculating, with a data processor, a theoretical transmission $T_i$ of light through the layer;

calculating, with the data processor, an expected deposition time $t_i$ of the layer, measuring, during deposition of the layer for a period less than $t_i$, a measured transmission $T_m$ of light through the layer;

determining, with the data processor, when deposition of the layer is to terminate based upon the theoretical transmission $T_i$ and the measured transmission $T_m$.

2. The method of claim 1 wherein $t_i$ is calculated based upon a desired thickness of the layer d and a known deposition rate r for the layer.

3. The method of claim 1, wherein calculating $T_i$ calculates $T_i$ based upon a desired thickness d of the layer at a series of wavelengths, thereby generating a series of curves $T_i$ vs. d at each of the series of wavelengths, wherein measuring $T_m$ measures $T_m$ as a function of actual time transpired t, thereby generating a curve $T_m$ vs. t, and wherein the method further comprises:

determining an optical monitoring wavelength $\lambda_m$ based upon the series of curves $T_i$ vs. d, thereby selecting a single curve $T_i$ vs. d at $\lambda_m$ from the series of curves, wherein determining when deposition of the layer is to terminate comprises:

generating a plurality of transmission data curves $T_{ijk}$ as a function of multiple time values based upon the single curve $T_i$ vs. d at $\lambda_m$;

calculating error between each $T_{ijk}$ curve and the curve $T_m$ vs. t;

selecting one of the plurality of $T_{ijk}$ curves having a minimum calculated error, the selected $T_{ijk}$ curve being associated with one of the multiple time values; and determining when deposition of the layer is to terminate based upon the one of the multiple time values.

4. The method of claim 3 wherein generating the plurality of transmission data curves $T_{ijk}$ generates the curves $T_{ijk}$ by plotting values of $T_i$ against a two-dimensional array of time vectors.

5. The method of claim 3 wherein the plurality of transmission data curves $T_{ijk}$ are scaled prior to calculating error between each $T_{ijk}$ curve and the curve $T_m$ vs. t.

6. The method of claim 5, wherein if the curve $T_i$ vs. d at $\lambda_m$ has more than one extremum, (1) a mid-point between two extrema for each curve $T_{ijk}$ is scaled by a factor so that it equals a mid-point between two extrema of the curve $T_m$ vs. t, and (2) maximum and minimum values on each curve $T_{ijk}$ are scaled by scaling uniformly about a mean of the $T_{ijk}$ curve being scaled so that a difference between the maximum and minimum values for each curve $T_{ijk}$ is equal to that of the curve $T_m$ vs. t, and wherein if the curve $T_i$ vs. d at $\lambda_m$ does not have more than one extremum, the mean of each curve $T_{ijk}$ is scaled by a uniform factor so that the mean of each curve $T_{ijk}$ is equal to a mean of the measured curve $T_m$ vs. t.

7. The method of claim 3 wherein the optical filter is a long-wave-pass optical edge filter.

8. An optical long-wave-pass filter comprising a transparent substrate having a surface and alternating thin layers of materials having respectively different indices of refraction disposed overlying the surface wherein at least one of the layers is formed by the method of claim 3.

9. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter comprising a layer made by the method of claim 3.

10. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter comprising a layer made by the method of claim 3.

11. The method of claim 1, wherein calculating $T_i$ calculates $T_i$ based upon a desired thickness d of the layer at a series of wavelengths, thereby generating a series of curves $T_i$ vs. d at each of the series of wavelengths, wherein measuring $T_m$ measures $T_m$ as a function of actual time transpired t, thereby generating a curve $T_m$ vs. t, and wherein the method further comprises:

determining an optical monitoring wavelength $\lambda_m$ based upon the series of curves $T_i$ vs. d, thereby selecting a single curve $T_i$ vs. d at $\lambda_m$ from the series of curves; and converting the single curve $T_i$ vs. d at $\lambda_m$ to $T_i$ vs. t using the equation t=d/r, where r is a known deposition rate for the layer, wherein determining when deposition of the layer is to terminate comprises:

calculating a deposition rate $r_{ci}$ by minimizing an error between the curve $T_i$ vs. t and the curve $T_m$ vs. t, the minimizing occurring by varying parameters pertaining to the curve $T_i$ vs. t; and determining when deposition of the layer is to terminate based upon the calculated deposition rate $r_{ci}$ or a deposition rate derived therefrom.

12. The method of claim 11, wherein the layer is a current layer, wherein the parameters are $\beta_1$, $\beta_2$, $\beta_3$, and the deposition rate r, and wherein $\beta_1$, $\beta_2$, and $\beta_3$, are defined as:

$$\beta_1 = \frac{n_a^2 + n_{m+1}^2}{2}\left(|p|^2 + \frac{|q|^2}{n_{m+1}^2}\right) + 2n_a \text{Re}(pq^*),$$

$$\beta_2 = \frac{n_a^2 - n_{m+1}^2}{2}\left(|p|^2 - \frac{|q|^2}{n_{m+1}^2}\right), \text{ and}$$

$$\beta_3 = \left(\frac{n_a^2}{n_{m+1}} - n_{m+1}\right)\text{Im}(p^*q),$$

where $n_a$ is a refractive index of an incident medium, $n_{m+1}$ is a refractive index of the layer, and p and q are defined as:

$$\begin{bmatrix} p \\ q \end{bmatrix} = \prod_{l=1}^{m} \begin{bmatrix} \cos\theta_l & -i\sin\theta_l/n_l \\ -in_l\sin\theta_l & \cos\theta_l \end{bmatrix} \begin{bmatrix} 1 \\ n_s \end{bmatrix}$$

where $\theta_l$ is accumulated phase in an $l_{th}$ layer of the optical filter, m represents a number of layers that have been deposited, $n_l$ is a refractive index of the $l_{th}$ layer, $n_S$ is a refractive index of a substrate, and $i=\sqrt{-1}$ in the definition of p and q.

13. The method of claim 11 further comprising:

calculating a best deposition rate $r_{bi}$ by calculating a rolling average of other $r_{ci}$ deposition rates, wherein determining when deposition of the layer is to terminate determines when deposition of the layer is to terminate based upon the best deposition rate $r_{bi}$.

14. The method of claim 11 wherein the optical filter is a short-wave-pass optical edge filter.

15. An optical short-wave-pass filter comprising a transparent substrate having a surface and alternating thin layers of materials having respectively different indices of refraction disposed overlying the surface wherein at least one of the layers is formed by the method of claim 11.

16. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter comprising a layer made by the method of claim 11.

17. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter comprising a layer made by the method of claim 11.

18. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter comprising a layer made by the method of claim 1.

19. The optical analysis system of claim 18 wherein the first filter is a long-wave-pass filter or a short-wave-pass filter.

20. The optical analysis system of claim 18 wherein the second filter is a long-wave-pass filter or a short-wave-pass filter.

21. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter comprising a layer made by the method of claim 1.

22. A method of making an optical filter using an apparatus, the filter designed to have N layers and the method comprising:

calculating, with a data processor, theoretical transmission data for each layer;

determining, with the data processor, which of the N layers are to be optically monitored;

calculating an expected deposition time for a current layer being deposited based upon a designed thickness of the layer and a deposition rate of the apparatus for the layer, the current layer being one of the N layers;

measuring, during deposition of the current layer for a time less than the expected deposition time, measured transmission data for the current layer, if the current layer is determined to be an optically monitored layer;

determining, with the data processor, when deposition of the current layer is to terminate based upon the theoretical transmission data and the measured transmission data, if the current layer is determined to be an optically monitored layer;

determining, with the data processor, when deposition of the current layer is to terminate based upon expiration of the expected deposition duration, if the current layer is not determined to be an optically monitored layer.

23. The method of claim 22 wherein determining which of the N layers are to be optically monitored comprises:

adding noise to the theoretical transmission data, thereby generating estimated actual transmission data;

simulating deposition of the N layers using the theoretical transmission data and the estimated actual transmission data, the simulating producing a simulated thickness for each layer;

calculating an error between the simulated thickness and the designed thickness for each layer;

selecting layers that have an error below a threshold as layers to be optically monitored.

24. The method of claim 23 wherein the optical filter is a long-wave-pass optical edge filter and the threshold is 0.2% error.

25. The method of claim 23 wherein the optical filter is a short-wave-pass optical edge filter and the threshold is 0.5% error.

26. An optical filter comprising a transparent substrate having a surface and one or more thin layers of material disposed overlying the surface wherein at least one of the layers is formed by the method of claim 1.

27. The optical filter of claim 26 wherein the one or more thin layers of material comprise a plurality of alternating layers of materials having respectively different indices of refraction.

28. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter made by the method of claim 22.

29. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter made by the method of claim 22.

30. An optical edge filter comprising a transparent substrate having a surface and alternating thin layer of materials having respectively different indices of refraction disposed overlying the surface, the materials comprising hard coating materials, and the thicknesses of the layers chosen to produce a filter edge steepness less than about 0.8%, wherein edge steepness is defined as (a) an edge width from a 50% transmission wavelength to an optical density 6 ("$OD6$") wavelength divided by (b) the 50% transmission wavelength.

31. The optical edge filter of claim 30 wherein the filter edge steepness is less than about 0.463%.

32. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter according to claim 31.

33. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter according to claim 31.

34. The optical edge filter of claim 30 wherein the filter average transmission is above about 93%.

35. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter according to claim 34.

36. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter according to claim 34.

37. The optical edge filter of claim 30 wherein the filter average transmission is above about 95%.

38. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter according to claim 37.

39. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter according to claim 37.

40. An optical analysis system for exciting a sample of material with light of a first wavelength to produce a measurable or viewable optical response at a second wavelength different from the first, the system comprising a source of excitation light, an optical path coupling the excitation light to the sample, an optical path coupling light from the sample to an analyzer or viewer, and a filter in the path between the sample and the analyzer or viewer for blocking some light other than the optical response at the second wavelength, wherein the filter is an optical edge filter according to claim 30.

41. An optical analysis system for exciting a sample of material with light of a first wavelength to produce a measurable or viewable optical response at a second wavelength different from the first, the system comprising a source of excitation light, an optical path coupling the excitation light to the sample, a first filter in the path between the source and the sample for blocking light at some wavelengths different from the excitation light, an optical path coupling light from the sample to an analyzer or viewer and a second filter in the path between the sample and the analyzer or viewer for blocking some light other than the optical response at the second wavelength, wherein at least the first or the second filter is an optical edge filter according to claim 30.

* * * * *

(12) EX PARTE REEXAMINATION CERTIFICATE (8094th)

United States Patent
Clarke et al.

(10) Number: US 7,068,430 C1
(45) Certificate Issued: Mar. 15, 2011

(54) METHOD OF MAKING HIGHLY DISCRIMINATING OPTICAL EDGE FILTERS AND RESULTANT PRODUCTS

(75) Inventors: Glenn Clarke, Rochester, NY (US); Turan Erdogan, Spencerport, NY (US); Joseph T. Foss, Rochester, NY (US); Ligang Wang, Rochester, NY (US)

(73) Assignee: Semrock, Inc., Rochester, NY (US)

Reexamination Request:
No. 90/010,629, Dec. 9, 2009

Reexamination Certificate for:
Patent No.: 7,068,430
Issued: Jun. 27, 2006
Appl. No.: 10/840,134
Filed: May 6, 2004

Related U.S. Application Data

(60) Provisional application No. 60/468,245, filed on May 6, 2003.

(51) Int. Cl.
*G02B 5/28* (2006.01)

(52) U.S. Cl. ............... 359/589; 359/580; 359/587; 359/588

(58) Field of Classification Search ............ 359/589
See application file for complete search history.

(56) References Cited

U.S. PATENT DOCUMENTS

| | | |
|---|---|---|
| 4,229,066 A | 10/1980 | Rancourt et al. |
| 4,293,732 A | 10/1981 | Rancourt et al. |
| 4,310,783 A | 1/1982 | Temple et al. |
| 4,578,527 A | 3/1986 | Rancourt et al. |
| 4,663,557 A | 5/1987 | Martin, Jr. et al. |
| 4,735,488 A | 4/1988 | Rancourt et al. |
| 4,846,551 A | 7/1989 | Rancourt et al. |
| 5,272,518 A | 12/1993 | Vincent |
| 5,828,489 A | 10/1998 | Johnson et al. |
| 6,110,337 A | 8/2000 | Sullivan et al. |
| 6,217,720 B1 | 4/2001 | Sullivan et al. |
| 7,119,960 B1 | 10/2006 | Erdogan et al. |
| 7,123,416 B1 | 10/2006 | Erdogan et al. |

OTHER PUBLICATIONS

Scobey et al., Passive DWDM components using Micro-Plasma® optical interference filters, OFC '96 Technical Digest, vol. 2, pp. 242–243 (1996).*

Sh. A. Furman, et al., "Chapter 1 Spectral characteristics of Multilayer Coatings: Theory," from *Basics of Optics of Multilayer Systems*, Edition Frontieres, Gif–Sur–Yvette (1992), pp. 1–103 (104 pages total).

H.A. MacLeod, "Thin–Film Optical Coating Design," *Thin–Films for Optical Systems*, F.R. Flory, ed., Marcel Dekker, Inc., 1995, pp. 17–19, 30–32 (7 pages).

Spectra Software, "Summary of TRCalc Features," web.archive.org/web/200204020036535/www.sspectra.com, (3 pages).

Thin–Film Center, Inc., "The Concise Macleod," web.archive.org/web/20020205061111/www.thinfilmcenter.com, (3 pages).

(Continued)

*Primary Examiner* — James Menefee

(57) ABSTRACT

Highly discriminating optical edge filters and methods of making the same are disclosed. The optical edge filters have an edge steepness greater than about 0.8% as measured by dividing (a) the edge width from the 50% transmission wavelength to the optical density 6 ("OD6") wavelength by (b) the 50% transmission wavelength. The optical filters also have an average transmisison above about 95%. The methods for making such filters accurately determine when deposition of each layer of the filter should terminate. The methods include calculating theoretical transmission data for a layer of the filter and calculating an expected deposition duration for the layer. The methods also include measuring transmission through the layer during deposition for a period less than the expected deposition duration. When the measuring period elapses, a new deposition duration is calculated based upon the theoretical transmission data and the measured transmission data, thereby providing an accurate deposition duration for the layer.

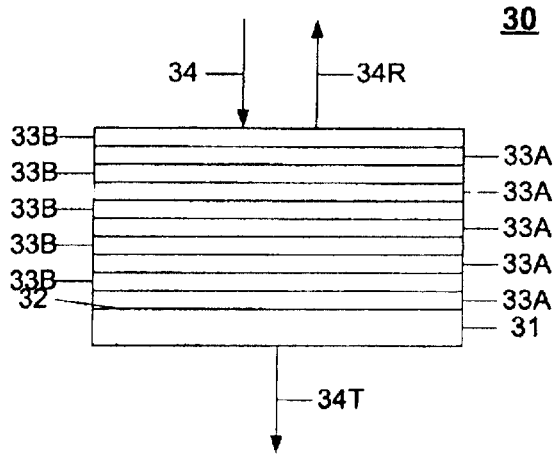

OTHER PUBLICATIONS

R.-Y. Tsai, et al., "Comparative Study of Ultraviolet–Infrared Cutoff Filters Prepared by Reactive Electron–Beam Deposition and Reactive Ion–Assisted Deposition," *Opt. Eng.*, May 1998, pp. 1475–1481 (17 pages).

Cover page and Table of Contents of vol. 1 of 3 of the Technical Program Proceedings of NFOEC 2001, Tuesday Jul. 10, 2001, pp. v–x (7 pages).

Cover page and Table of Contents of vol. 2 of 3 of the Technical Program Proceedings of NFOEC 2001, Wednesday Jul. 11, 2001, pp. v–x (7 pages).

Cover page and Table of Contents of vol. 3 of 3 of the Technical Program Proceedings of NFOEC 2001, Thursday Jul. 12, 2001, pp. v–xi (8 pages).

Fortenberry et al., "Optical Filter Dispersion in 40 Gb/s DWDM Transmission Systems," in vol. 2 of 3 of the Technical Program Proceedings of NFOEC 2001, Jul. 11, 2001, pp. 670–677.

G. Lenz et al., "Dispersive Properties of Optical Filters for WDM Systems," IEEE Journal of Quantum Electronics, vol. 34, No. 8, Aug. 1998.

M. A. Scobey and P. Stupik "Improved Temperature and Humidity Stability of Ultra–Narrow Band Filters," Society of Vacuum Coaters, 37th Annual Technical Conference Proceedings, pp. 47–52, Aug. 1994.

"Precision Interference Filters", a product brochure from Omega Optical, Incorporated, dated 1998 (month unknown).

R.L. Hall, et al., "The Fabrication of Rugate Filters Using the Digital Technique," Optical Interference Coatings, Technical Digest Series, vol. 6, (Optical Society of America, Washington, DC 1988), pp. TuF10–1–TuF10–4 (4 pages).

Walter E Johnson, et al., "Introduction to rugate filter technology," Proceedings of the SPIE, vol. 2046 pp. 88–108 (1993) (21 pages).

A. Fornier et al., "High laser damage threshold $HfO_2/SiO_2$ mirrors manufactured by sputtering process," Proceedings of the SPIE, vol. 3492 pp. 912–920 (1999) (9 pages).

Robert Q. Fugate, "Prospects for benefits to astronomical adaptive optics from US military programs," Proceedings of the SPIE, vol. 4007 pp. 422–429 (2000) (8 pages).

Robert B. Sargent, et al., "Review of Thin Films in Telecommunications Applications", Optical interference Coatings (OIC) 2001, Banff, Canada, OIC Proc. Telecommunication Filters I (WA), p. WA2–1–WA2–3 (Jul. 15, 2001) (3 pages).

H. Hagedorn, et al., "Ultra narrow band pass filters produced by plasma ion assisted deposition," Optical Interference Coatings (OIC) Banff Canada, Telecommunication Filters I (WA), p. WA4–1–WA4–3 (Jul. 15, 2001) (3 pages).

Fortenberry, R., et al., "Optical Filter Dispersion in 40 Gb/s DWDM Transmission Systems", *National Fiber Optic Engineers Conference* Jun. 22, 2001.

Jensen, T. R., et al., "Environmentally Stable UV Raman Edge Filters", *Society of Vacuum Coaters 43rd Annual Technical Conference Proceedings*, 2000, pp. 1–5.

MacLeod, H. A., "Thin–Film Optical Filters", *3rd Edition, Taylor & Francis, NY*, 2001.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 13, lines 55-63:

At 615, the best rate $r_{bi}$ is used to calculate the layer termination time $t_r = d/r_{bi}$, and the layer is terminated when the clock reaches this time. Once deposition of the current layer is complete, the deposition apparatus 400 of FIG. 4 is reconfigured at 616 to start depositing the material associated with the next layer i+1, and the process loops back to 607. However, if all layers have been deposited, manufacturing of the SWP filter is [compete] *complete*, and the process ends at 617.

AS A RESULT OF REEXAMINATION, IT HAS BEEN DETERMINED THAT:

Claim 30 is determined to be patentable as amended.

Claims 31, 34 and 37, dependent on an amended claim, are determined to be patentable.

Claims 1-29, 32, 33, 35, 36 and 38-41 were not reexamined.

30. An optical edge filter comprising a transparent substrate having a surface and alternating thin layer of materials having respectively different indices of refraction disposed overlying the surface, the materials comprising hard coating materials, and the thicknesses of the layers chosen to produce a filter edge steepness less than about 0.8%, wherein edge steepness is defined as (a) an edge width from a 50% transmission wavelength to an optical density [6$_{(``OD}$6")] *6 (``OD6'')* wavelength divided by (b) the 50% transmission wavelength.

\* \* \* \* \*